US012276247B2

(12) United States Patent
Bushnell

(10) Patent No.: US 12,276,247 B2
(45) **Date of Patent: *Apr. 15, 2025**

(54) UTILIZING HYDROSTATIC AND HYDRAULIC PRESSURE TO GENERATE ENERGY, AND ASSOCIATED SYSTEMS, DEVICES, AND METHODS

(71) Applicant: John Bushnell, Tacoma, WA (US)

(72) Inventor: John Bushnell, Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/800,471

(22) Filed: Aug. 12, 2024

(65) Prior Publication Data

US 2024/0401558 A1 Dec. 5, 2024

Related U.S. Application Data

(63) Continuation-in-part of application No. 18/409,722, filed on Jan. 10, 2024, now Pat. No. 12,060,861,
(Continued)

(51) Int. Cl.
*F03B 17/02* (2006.01)
*F15B 3/00* (2006.01)

(52) U.S. Cl.
CPC .............. *F03B 17/025* (2013.01); *F15B 3/00* (2013.01); *F05B 2220/709* (2013.01);
(Continued)

(58) Field of Classification Search
CPC ........ F03B 17/00; F03B 17/02; F03B 17/025; F03B 13/00; F15B 3/00; F15B 11/072;
(Continued)

(56) References Cited

U.S. PATENT DOCUMENTS 3,942,323 A 3/1976 Maillet
3,991,574 A 11/1976 Frazier
(Continued)

FOREIGN PATENT DOCUMENTS

ES 2528334 A1 2/2015
FR 2970747 A1 7/2012
(Continued)

OTHER PUBLICATIONS

PCT International Search Report and Written Opinion of the International Searching Authority (PCT/US24/11109), dated May 30, 2024.

(Continued)

*Primary Examiner* — Mark A Laurenzi
*Assistant Examiner* — Xiaoting Hu
(74) *Attorney, Agent, or Firm* — Sierra IP Law, PC; Mark D. Miller

(57) ABSTRACT

Systems, devices, and methods for utilizing hydrostatic and/or hydraulic pressure to generate energy and to separate water into hydrogen and oxygen are disclosed herein. A representative industrial system can comprise a storage tank containing fluid, a separator piston having a first separator compartment configured to be fluidically coupled to the storage tank and a second separator compartment, and a pressure intensifier. The pressure intensifier includes a first compartment, and a second compartment fluidically coupled to the second separator compartment. The second compartment of the pressure intensifier includes a pressure concentrator having a housing, a piston head member including arms, a plurality of cylinders each defined in part by the housing, and a drive piston head portion. Pressurized water may be depressurized by sending it through fine bore friction channels to produce water vapor and/or steam, which may then be injected into plasma reactors that separate water into
(Continued)

UTILIZING HYDROSTATIC PRESSURE IN BODIES OF WATER TO PRODUCE HYDROGEN hydrogen and oxygen. Some embodiments may involve injecting a catalyst into the plasma reactors with the water vapor and/or steam.

14 Claims, 12 Drawing Sheets

Related U.S. Application Data which is a continuation-in-part of application No. 18/365,431, filed on Aug. 4, 2023, which is a continuation of application No. 18/153,966, filed on Jan. 12, 2023, now Pat. No. 11,746,740.

(52) U.S. Cl.
CPC ..... *F05B 2260/30* (2013.01); *F05B 2260/422* (2020.08); *F05B 2260/60* (2013.01); *F15B 2211/216* (2013.01)

(58) Field of Classification Search
CPC ............ F15B 11/0725; F15B 2211/212; F15B 2211/216; F05B 2220/61; F05B 2260/422; F05B 2260/60; Y02E 60/36; C01B 3/042; C01B 3/045; C01B 13/0207; C01B 2203/0861; B01J 19/08; B01J 19/087; B01J 19/088; B01J 2219/0894; B01J 2219/0896; B01J 2219/0898; B01D 2259/818; C25B 1/04; C25B 1/042; C25B 1/044
See application file for complete search history.

(56) References Cited

U.S. PATENT DOCUMENTS 4,170,876 A 10/1979 Dits
4,271,671 A 6/1981 Smeets
6,245,309 B1 * 6/2001 Etievant .............. H01M 8/0631 95/55
7,384,619 B2 * 6/2008 Bar-Gadda ............. B01J 19/127 423/658.2
8,815,209 B2 * 8/2014 Elkind .................... C01B 3/042 422/162
8,931,278 B2 * 1/2015 Hirson ...................... C01B 3/06 122/31.1
2002/0100836 A1 * 8/2002 Hunt ...................... B63H 21/00 244/50
2002/0149140 A1 10/2002 Kitaura
2002/0175084 A1 * 11/2002 Futamura .................. C01B 3/22 205/637
2003/0059353 A1 * 3/2003 Wootan .................. B01J 19/088 423/437.1
2005/0029120 A1 * 2/2005 Bar-Gadda .............. C01B 21/30 205/628
2009/0200176 A1 * 8/2009 McCutchen .............. C25B 1/02 205/555
2011/0262313 A1 * 10/2011 Hitz ........................ C01B 3/506 422/186.01
2014/0102887 A1 * 4/2014 Podobedov ............... C25B 1/04 204/278
2014/0116490 A1 * 5/2014 Morgan .................. C01B 3/501 136/202
2014/0130911 A1 5/2014 Chaing et al.
2015/0192017 A1 7/2015 Quiros et al.
2016/0348671 A1 12/2016 Candiani
2019/0383260 A1 12/2019 Frye
2021/0179451 A1 * 6/2021 Ballantine ........... C01B 13/0207

FOREIGN PATENT DOCUMENTS

JP 2001221013 A * 8/2001
JP 2014205599 A * 10/2014
KR 20100118181 A 11/2010
KR 20140123896 A 10/2014
WO 20020240872 A1 5/2002

OTHER PUBLICATIONS

Serge Marguet, "The Technology of Pressurized Water Reactors", Springer Nature Switzerland, AG (2002), ISBN 978-3-030-86637-2.
English language abstract of foreign patent document JP2001221013A, downloaded Sep. 10, 2024, available online https://worldwide.espacenet.com/patent/search/family/018586847/publication/JP2001221013A?q=pn%3DJP2001221013A.
English language abstract of foreign patent document JP2014205599A, downloaded Sep. 10, 2024, available online https://worldwide.espacenet.com/patent/search/family/052119510/publication/JP2014205599A?q=pn%3DJP2014205599A.

* cited by examiner

UTILIZING HYDROSTATIC PRESSURE IN BODIES OF WATER TO PRODUCE HYDROGEN

UTILIZING HYDROSTATIC AND HYDRAULIC PRESSURE TO GENERATE ENERGY, AND ASSOCIATED SYSTEMS, DEVICES, AND METHODS

This is a continuation in part of U.S. application Ser. No. 18/409,722 filed on Jan. 10, 2024, which is a continuation in part of U.S. patent application Ser. No. 18/365,431 filed on Aug. 4, 2023, which is a continuation of U.S. patent application Ser. No. 18/153,966 filed on Jan. 12, 2023, now U.S. Pat. No. 11,746,740, all of which are incorporated herein by this reference in their entireties.

TECHNICAL FIELD

This present disclosure relates to utilizing hydraulic and hydrostatic pressure to generate energy. Particular embodiments relate to recovering hydrostatic pressure from industrial storage tanks or pressurized sources to generate compressed fluids for producing energy and/or providing other functions.

BACKGROUND

Industrial facilities often include storage tanks and other related equipment that contain fluid (e.g., fuels, chemicals, etc.) and have significant hydraulic and hydrostatic pressure. While the fluid is utilized within processes of the facilities or sold as product, the hydraulic and hydrostatic pressure and potential energy of the fluid and/or storage tanks are often under-utilized or not utilized at all. As a result, the energy associated with the fluid and/or storage tank is wasted. In addition to hydrostatic pressure generated within fluid storage tanks, industrial facilities can use hydrostatic and hydraulic pressure in their processes, which after being used is typically discharged as waste. Accordingly, there is a need for systems, devices, and/or methods that can better utilize the hydraulic and hydrostatic pressure of such fluids and/or storage tanks.

SUMMARY

Embodiments of the present invention relate to utilizing hydrostatic and/or hydraulic pressure to generate energy. One way this may be accomplished is by pressurizing water and then depressurizing it through fine bore friction channels to produce water vapor and/or steam, which may then be injected into plasma reactors that separate water into hydrogen and oxygen. Some embodiments may involve injecting a catalyst into the plasma reactors with the water vapor and/or steam. Potential catalysts include without limitation, gases such as nitrogen, argon, helium, xenon, krypton, etc. These catalysts may be injected into plasma reactors to assist in dissociating water into its constituent components. It is to be appreciated that any of the disclosed embodiments are capable of functioning with or without the inclusion of injecting catalyst(s) into the plasma reactors.

Particular embodiments relate to recovering hydrostatic pressure from industrial fluid storage tanks, (Including without limitation municipal and private water tanks and waste water treatment tanks) or by utilizing buildings and structures to support pipes, tubes, conduits, or other containers that are filled with fluid which develop hydrostatic pressure as a function of their fluid collum height. In some embodiments, hydrostatic pressure may be recovered from bodies of water including lakes, oceans, water behind hydroelectric dams, or any other body of water regardless of its depth, including without limitation both salt and fresh water. In some embodiments, waste hydrostatic pressure may be recovered from industrial processes that utilize hydrostatic pressure, particularly waste hydrostatic and hydraulic pressure used in the high-pressure food processing industry, or from industrial fluid accumulators. In some embodiments, hydraulic and hydrostatic pressure may be recovered from other pressurized fluid sources that generate compressed fluids including without limitation from fluid pumps used in municipal and private water supply systems, (and/or fluid pumps used in other applications), or by utilizing pneumatic pumps to compress fluids (Including without limitation windmills, ocean wave pumps and other sources of pneumatic pressure).

Embodiments of the present invention relate to systems and methods for moving hydrogen and oxygen to the surface when water molecules have been dissociated by plasma reactors that are positioned below the surface in bodies of water. Embodiments of the present invention may utilize compression chambers that are external to the primary compression chamber of the intensifier which produces products of pressurization.

Embodiments of the present invention can be utilized to decompress wasted hydrostatic pressure, for example and without limitation, by accelerating it through fine bore friction channels, orifices, fittings and/or valves and into plasma reactors to produce hydrogen and oxygen. This is especially applicable in the high-pressure food processing industry. Vertical pipes, tubes, conduits, or other containers which are filled with fluid develop hydrostatic pressure as a function of their fluid collum height. By utilizing buildings and structures to support these vertical or partially vertical containers of water, hydrostatic pressure can be developed to produce feed stock for plasma reactors that dissociate water into hydrogen and oxygen.

A significant amount of hydrostatic potential energy is found in bodies of water that is not being utilized. Embodiments of the present invention provide new and novel approaches for converting such hydrostatic potential energy into usable kinetic energy. Embodiments of the present invention accomplish this by placing an embodiment of a pressure intensifier along with plasma reactors that separate water into hydrogen and oxygen, beneath the surface of these bodies of water.

Some of these embodiments include fine bore friction channels which help in the process of converting water into water vapor and/or steam. The pressure intensifier pressurizes water. The water is then accelerated by decompressing it through friction channels which converts it to water vapor and or steam, making it feed stock for plasma reactors that dissociate it into hydrogen and oxygen. These underwater embodiments leverage the hydrostatic pressure that is within bodies of water to produce feed stock for plasma reactors. After the plasma reactors separate water into hydrogen and oxygen, embodiments of the invention provide the novel application of utilizing the buoyance of hydrogen and oxygen, relative to water, to facilitate low energy transport of these chemicals to the water's surface.

Pneumatic pressure sources, including without limitation windmills, ocean wave pumps and other sources of pneumatic pressure, can be used to compress fluids, in conjunction with the pressure intensifiers of embodiments of the present invention to provide feed stock to plasma reactors. Municipal & private water supply systems and fluid tanks, along with hydrostatic pressure from wastewater treatment tanks, and/or any fluid pump can be utilized to provide hydraulic and/or hydrostatic pressure to the pressure intensifiers of embodiments of the present invention. Compression chambers may be external to the primary compression chamber of embodiments of the intensifier of the present invention, which may produce products of pressurization, and/or energy and/or other functions.

BRIEF DESCRIPTION OF THE DRAWINGS

Features, aspects, and advantages of the presently disclosed technology may be better understood with regard to the following drawings. The components in the drawings are not necessarily to scale. Instead, emphasis is placed on illustrating clearly the principles of the present disclosure.

Figure 1:
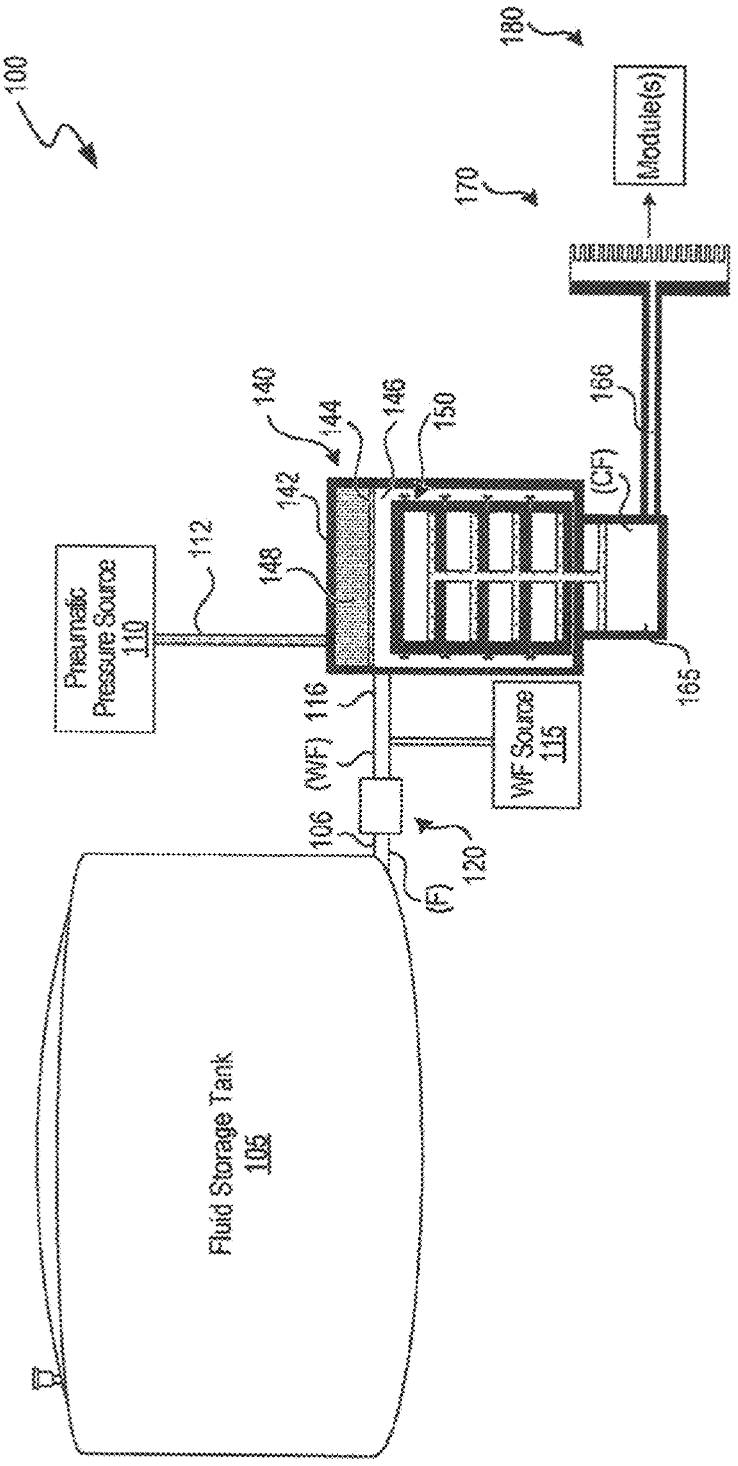
FIG. 1 is a schematic cross-sectional view of a system for utilizing hydrostatic pressure, in accordance with embodiments of the present technology.

It is to be appreciated that the schematic cross-sectional views of the drawings are not necessarily to scale.

A person skilled in the relevant art will understand that the features shown in the drawings are for purposes of illustrations, and that variations, including different and/or additional features arrangements, and scale thereof, are possible.

DETAILED DESCRIPTION

A. Overview

The hydraulic pressure and/or potential energy of fluid in industrial storage tanks (e.g., at oil and gas facilities, manufacturing plants, etc.) are often under-utilized or not utilized at all, and as a result the energy associated with the fluid and/or storage tank is wasted. Embodiments of the present technology address at least some of these issues via a system that utilizes the hydrostatic and hydraulic pressure to generate energy and/or perform other useful functions. For example, embodiments of the present technology include a system comprising a storage tank containing a fluid, a separator piston, and a pressure intensifier having a first compartment and a second compartment. The separator piston includes a cylinder, and a piston member movable within the cylinder. The piston member within the cylinder defines a first separator compartment fluidically coupled to a bottom portion of the storage tank, and a second separator compartment fluidically coupled to the second compartment of the pressure intensifier. The pressure intensifier further includes a pressure concentrator in the second compartment and a compression chamber downstream of the pressure concentrator. The pressure concentrator can include a housing, a piston head member having arms, a plurality of cylinders each at least partially defined by the housing and the arms of the piston head member, and a drive piston head portion. The drive piston head portion is adjacent to the compression chamber and is configured to apply thereto a pressure equal to the sum of the individual pressures applied via the arms of the piston head member. Each of the cylinders can include a first compartment configured to contain a working fluid, a second compartment spaced apart from the first compartment, and a biasing member applying a force against a corresponding arm of the piston head member in a direction away from the compression chamber. In operation, hydrostatic pressure from the fluid of the storage tank is applied via the separator piston to the second compartment of the pressure intensifier. Additionally, pressure from a pneumatic pressure source is applied to the first compartment of the pressure intensifier. In response to these applied pressures, the arms of the piston head member of the pressure intensifier can exert a pressure that is collectively applied to the drive piston head portion, which applies the collective pressure on to the compression chamber to generate a compressed fluid (CF). The compressed fluid (CF) can be used to perform multiple other useful functions, including processing products (e.g., food products), generating energy, and/or forming oxygen, hydrogen, and/or other compounds for energy harvesting. The uses of the compressed fluid (CF) are described in additional detail herein.

The systems, devices, and methods of embodiments of the present technology have multiple advantages over related conventional technologies. For example, systems configured in accordance with embodiments of the present technology can convert the potential energy of the fluid in storage tanks, in bodies of water, in columns of fluid in vertical pipes, tubes, conduits, or other containers that develop hydrostatic pressure from their fluid collum height and are supported by buildings and other structures, into usable energy and/or compounds that can be combusted without producing harmful emissions. In doing so, embodiments of the present technology can sustainably generate energy from sources that are otherwise being underutilized or not utilized at all.

Embodiments of the present technology can be utilized in multiple applications, including at oil and gas facilities, municipal sewage and water facilities, hydroelectric dams, manufacturing plants and systems, and the like.

Embodiments of the present technology may be adapted to receive hydrostatic pressure and/or hydraulic pressure from one or more sources including but not limited to:

From hydrostatic and/or hydraulic pressure within any fluid storage tank and/or industrial fluid accumulator.

From the hydrostatically pressurized water that is behind dams or other water storage facilities, or from the hydrostatic pressure within any body of water, including without limitation fresh or salt water.

From pipes, tubes, conduits, or other columns of fluid and which develop hydrostatic pressure as a function of their fluid collum height. These structures may be supported by buildings and/or structures.

From various kinds of pumps including without limitation water pumps and pneumatic pumps.

From municipal and private water supply tanks and systems.

From municipal and private wastewater treatment tanks and systems.

From outputs of industrial processes where fluids (including without limitation air, water, hydraulic fluid, oil, etc.) are placed under pressure as part of the industrial process, and must then be released.

Embodiments of the present invention may be placed below the surface of bodies of water, utilizing hydrostatic pressure to produce hydrogen and oxygen. As such, embodiments of this present technology can be utilized to provide a system for bringing the produced hydrogen and oxygen to the surface.

In some of these embodiments, when placed below the surface in a body of water, regardless of the depth of where it is placed, after the intensifier has done its work and after the plasma reactor has performed chemical reactions, the water that was used to drive the intensifier will ordinarily need to be removed to make way for air that is used in a subsequent cycle. This water may be moved to the surface and/or moved back into the surrounding water by pressurizing it against the hydrostatic pressure that surrounds the system. In some embodiments the water, or some of this water, may be moved into the compression chamber, filling it for the next cycle.

In these embodiments, the hydrogen and oxygen that is produced by the plasma reactor needs to be moved to the surface. The methodology presented in the embodiment shown in FIG. 6 utilizes the relative buoyancy of hydrogen and oxygen, compared to the density of the surrounding water, to move the hydrogen and oxygen to the surface.

Additionally, if catalysts are used in the chemical reactions performed by the plasma reactor, the chemical constituents produced also need to be moved to the surface and/or moved back into the surrounding water by pressurizing them against the hydrostatic pressure that surrounds the system. Moving the hydrogen, oxygen, intensifier drain water, or any other generated substances to the surface or pressurizing them against the pressure that surrounds the system can be directly accomplished by utilizing hydraulic and or pumps. Alternatively, the pneumatic system illustrated in FIG. 6 can be utilized to accomplish these tasks.

Figure 6:
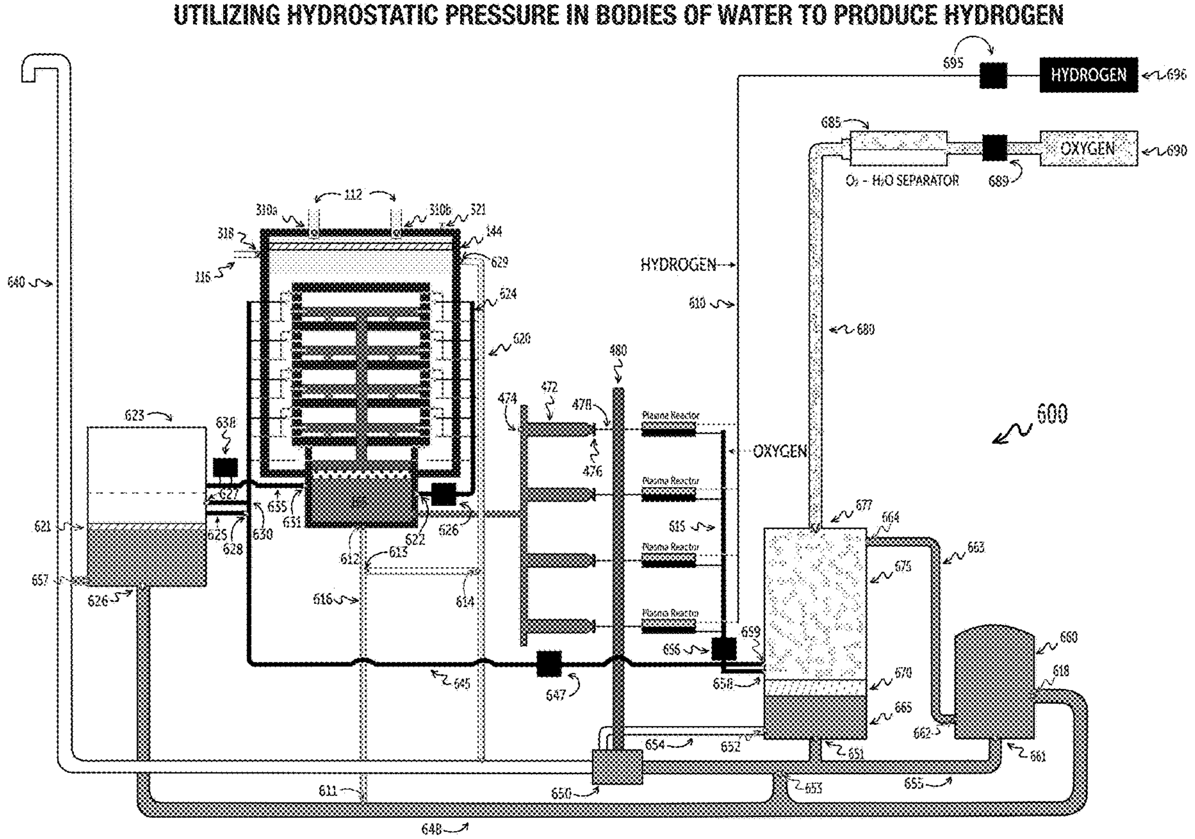
FIG. 6 is a schematic cross-sectional view of an embodiment of the invention submerged under water to utilize the hydrostatic pressure of the water.

It will be apparent to those having skill in the relevant art that changes may be made to the details of the methodology described in FIG. 6 without departing from the underlying principles of the present disclosure. Certain aspects of the methodology presented in FIG. 6 can be eliminated or combined with other components to perform the stated task without departing from the underlying principles of the present disclosure. Furthermore, while there are certain advantages associated with embodiments disclosed through the FIG. 6 methodology, other embodiments can also exhibit such advantages, and not all embodiments need necessarily exhibit such advantages or other advantages disclosed herein to fall within the scope of the technology.

Industrial facilities that use hydrostatic and hydraulic pressure in their processes typically underutilize or discard the pressurized fluid as waste, after being used. Embodiments of the present technology can decompress such wasted hydrostatic pressure by accelerating it through fine bore friction channels, orifices, fittings and/or valves, converting it into water vapor and/or steam, and then directing it through rotational impellers for conversion into useable kinetic energy, followed by directing the exhausted water vapor and/or steam into plasma reactors to produce hydrogen and oxygen. These embodiments are particularly applicable to recovering waste hydrostatic pressure that is used in the high-pressure food processing industry.

Embodiments of the present invention can be utilized to produce products of pressurization by placing such products within the compression chamber of the intensifier and/or by placing such products within a container that is external to the intensifier compression chamber and connecting the external container to the intensifier compression chamber via high pressure hydraulic lines.

Additionally, embodiments of the present technology can be utilized in generally inaccessible areas, such as in the ocean or other bodies of water, which as described herein can enable certain aspects of the present technology to operate more efficiently and/or with less energy.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from present technology. In addition, those of ordinary skill in the relevant art will appreciate that further embodiments of the various disclosed technologies can be practiced without several of the details described below.

B. Systems, Devices, and Methods for Utilizing Hydrostatic and Hydraulic Pressure to Generate Energy FIG. 1 is a schematic cross-sectional view of a system 100 for utilizing hydrostatic and hydraulic pressure, and/or converting hydrostatic pressure to usable energy, in accordance with embodiments of the present technology. The system 100 can include a fluid storage tank 105 containing a stored fluid (SF) (e.g., a fuel, chemical, or other liquid) that provides a hydrostatic pressure at a bottom portion of the tank 105 (e.g., of at least 20 psi, 30 psi, 40 psi, or 50 psi). The system 100 can further include a pneumatic pressure source 110 (e.g., a windmill, an ocean wave pneumatic generation device, etc.) and tank inlet conduit 112 extending from the pressure source 110 and/or other units of the system 100. As explained herein, the pressure source 110 is configured to provide pressurized gaseous fluid to a compartment of a pressure intensifier. As shown in FIG. 1, the tank 105 can include separator inlet conduit 106 coupled to the bottom portion of the tank 105.

The system 100 can further include a separator piston 120 fluidically coupled to the separator inlet conduit 106, and a pressure intensifier 140 coupled to the separator piston 120. The pressure intensifier 140 includes a housing 142, a first compartment 148 (e.g., an upper compartment), a second compartment 146 (e.g., a lower compartment), a base interface 144 between the first compartment 148 and the second compartment 146, a pressure concentrator 150 disposed within the second compartment 146, and a compression chamber 165 downstream of the pressure concentrator 150. The first compartment 148 is configured to receive a pressurized gaseous fluid (e.g., air) from the pressure source 110 via a pressure intensifier inlet conduit 112, and the second compartment 146 is configured to receive a working fluid (WF) (e.g., water) via a connecting conduit 116 fluidically coupled to the separator piston 120. The pressure concentrator 150 is configured to increase the pressure of the working fluid (WF) based on the pressure applied from the tank 105, including via the separator inlet conduit 106 and separator piston 120 from the bottom portion of the tank 105 and the pressure intensifier inlet conduit 112 from external pneumatic pressure source 110. In doing so, the pressure concentrator 150 can produce a compressed fluid (CF) in the compression chamber 165 of least 5,000 3,000 psi, 10,000 psi, 25,000 psi, 50,000 psi, 100,000 psi or higher. As explained elsewhere herein (e.g., with reference to FIGS. 3A and 3B), the pressure concentrator 150 can include a plurality of individual pistons that are configured to collectively increase the pressure of the working fluid (WF) (e.g., in the compression chamber 165). The system 100 can further include a WF source 115 fluidically coupled to the connecting conduit 116 extending between the second compartment 146 and the separator piston 120. In some embodiments, the WF source 115 can comprise a recycle line that recirculates water to and/or from the pressure intensifier 140 and/or other units of the system 100.

The system 100 can further include a manifold 170 downstream of and fluidically coupled to the compression chamber 165 of the pressure intensifier 140 via a manifold conduit 166, and one or more modules or plasma reactors 180 downstream of the manifold 170. As explained elsewhere herein (e.g., with reference to FIG. 4), the manifold 170 can include a plurality of chambers configured to utilize the pressure of the compressed fluid (CF). For example, in some embodiments the chambers of the manifold 170 can depressurize the compressed fluid (CF) to produce a water vapor source and/or steam, which can be utilized via the modules or plasma reactors 180 to generate hydrogen and/or oxygen gaseous products.

Figure 2:
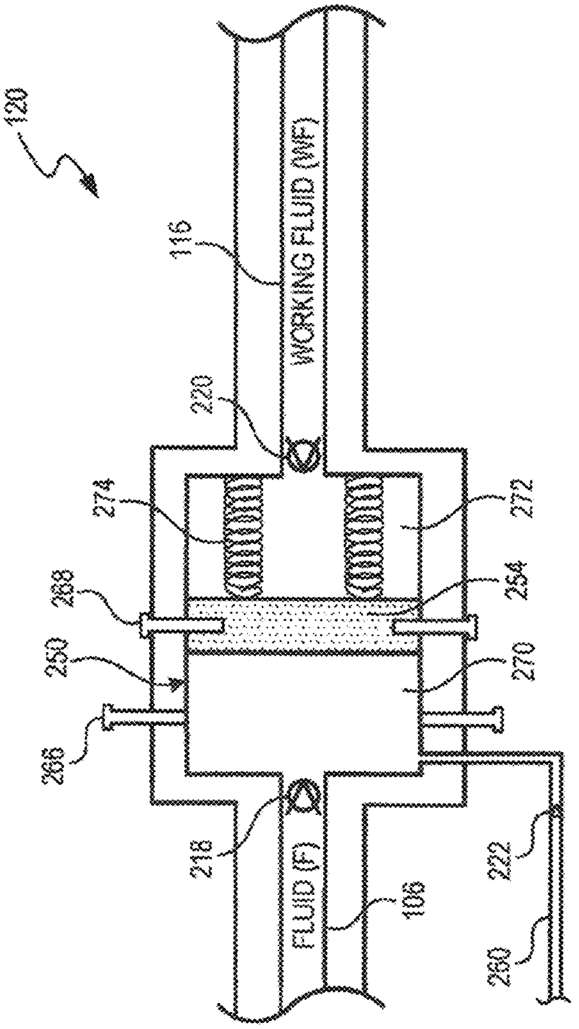
FIG. 2 is a schematic cross-sectional view of the separator piston of the embodiment of FIG. 1.

FIG. 2 is a schematic cross-sectional view of the separator piston 120 of FIG. 1. As shown in FIG. 2, the separator piston 120 includes a first separator compartment 270 fluidically coupled to the separator inlet conduit 106 extending from the tank 105 (FIG. 1) and configured to receive the stored fluid (SF), a second separator compartment 272 fluidically coupled to the connecting conduit 116 extending to the pressure intensifier 140 (FIG. 1) and configured to contain the working fluid (WF), and a separator piston member 254 between the first separator compartment 270 and the second separator compartment 272. The separator piston 120 can further include a biasing member 274 (e.g., a spring) within the second compartment 272 and configured to apply a biasing force on the separator piston member 254 in a direction away toward the first separator compartment 270 and/or away from the second separator compartment 272. The separator piston 120 can further include first and second separator shear pins 266, 268 configured to limit movement of the piston member 254 when engaged. The separator piston 120 is configured to transfer hydraulic pressure from the stored fluid (SF) in the separator inlet conduit 106 to the working fluid (WF) of the connecting conduit 116, without comingling the stored fluid (SF) with the working fluid (WF). In doing so, the separator 120 is able to utilize the pressure of the stored fluid (SF) without contaminating the working fluid (WF) that the pressure is effectively transferred to.

As shown in FIG. 2, the separator piston 120 can further include a separator inlet valve 218 at an inlet to the first separator compartment, a separator outlet valve 220 at an outlet from the second separator compartment 272, a pressure relief line 260 fluidically coupled to the first compartment 270 and configured to relieve pressure and/or fluid therein, and a pressure relief valve 222 on the pressure relief line 260. As described herein, the separator inlet valve 218, separator outlet valve 220, and the pressure relief valve 222 can be used to isolate the separator piston 120 from upstream and downstream sources (e.g., the tank 105 and the pressure intensifier 140) and remove fluid (F) from the first compartment 270.

Figure 3A:
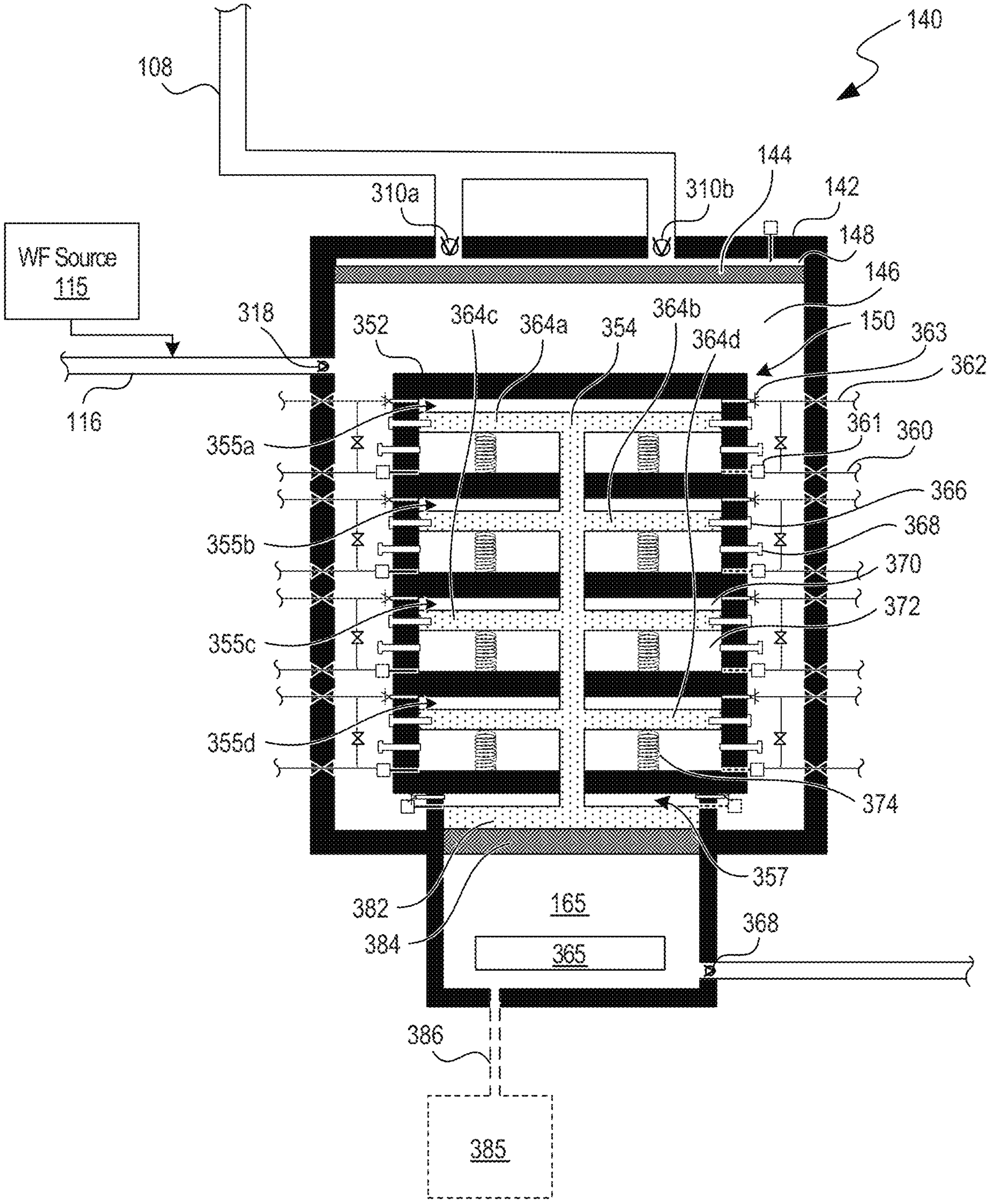
FIGS. 3A and 3B are schematic cross-sectional views of the pressure intensifier of the embodiment of FIG. 1.
Figure 3B:
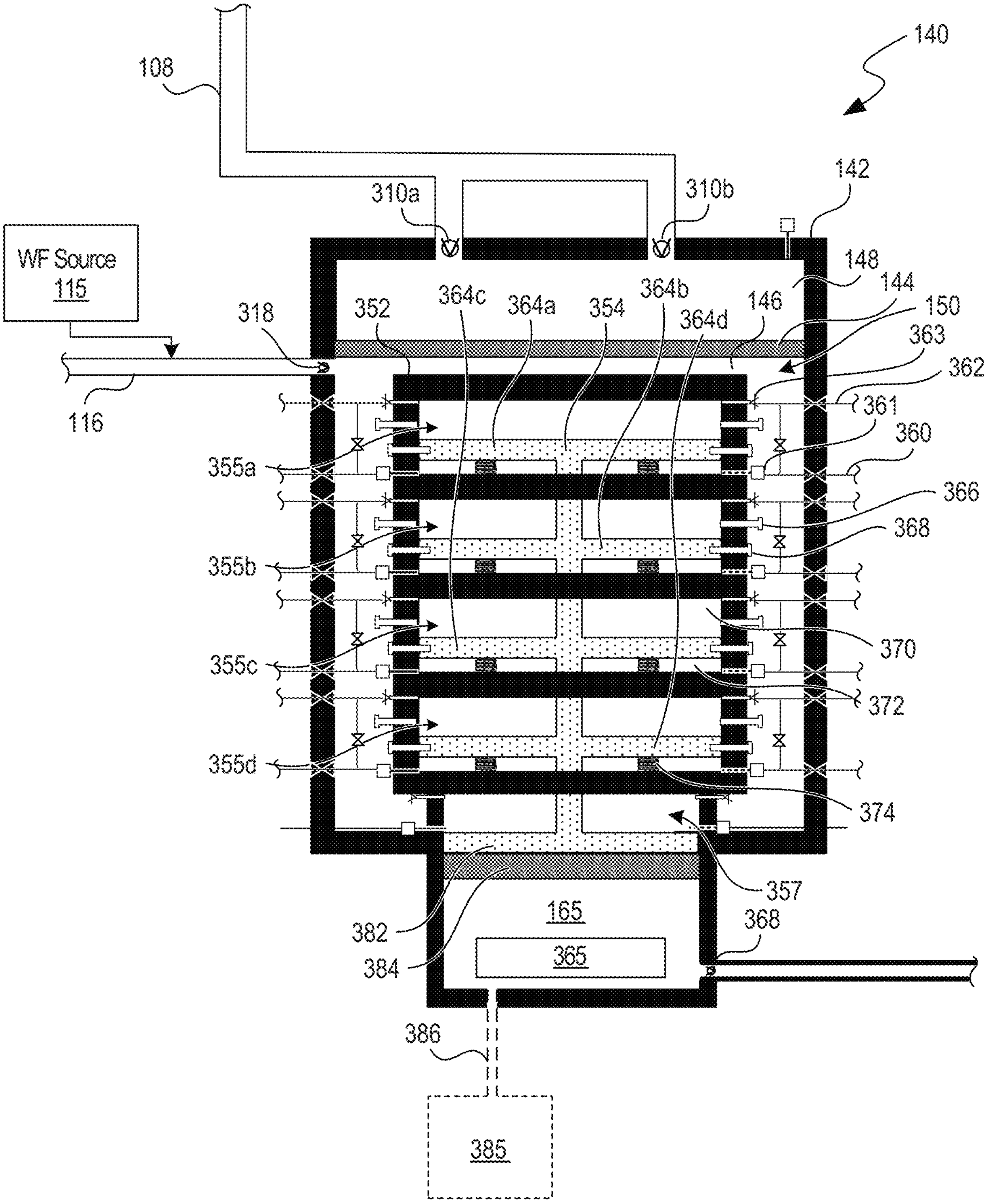

FIGS. 3A and 3B are schematic cross-sectional views of the pressure intensifier 140 of FIG. 1, in which the pressure intensifier 140 in FIG. 3A is in a depressurized (or less pressurized) state and the pressure intensifier 140 in FIG. 3B is in a pressurized (or more pressurized) state. Referring the FIGS. 3A and 3B together, and as previously described in FIG. 1, the pressure intensifier 140 includes the housing 142 defining an outer boundary of the pressure intensifier 140, the first compartment 148 fluidically coupled to the pressure intensifier inlet conduit 112, the second compartment 146 fluidically coupled to the connecting conduit 116, the pressure concentrator 150 within the second compartment 146, and the compression chamber 165 downstream of the pressure concentrator 150. The pressure intensifier inlet conduit 112 is configured to receive a pressurized gaseous fluid and can include one or more first inlet valves 310*a-b* to regulate the flow of gaseous fluid to and/or the pressure within the first compartment 148, and the connecting conduit 116 can include one or more second inlet valves 318 to regulate the flow of the working fluid (WF) to and/or the pressure within the second compartment 146. The base interface 144 is moveable within the housing 142 in response to pressure differentials between the first compartment 148 and the second compartment 146, e.g., to increase the volume of the first compartment 148 (and thereby decrease the volume of the second compartment 146) and decrease the volume of the first compartment 148 (and therein increase the volume of the second compartment 146). For example, a pressure increase in the first compartment 148 can cause the base interface 144 to move downward toward the pressure concentrator 150 to increase the volume of the first compartment 148 and decrease the volume (and thereby increase the pressure) of the second compartment 146.

The pressure concentrator 150 can include a housing 352, a piston head member 354 including arms 364*a-d* (collectively referred to as arms 364), a plurality of individual base cylinders 355*a-d* (collectively referred to as base cylinders 355) each at least partially defined by the housing 352 and corresponding arm 364 of the piston head member 354, and a drive cylinder 357 positioned at an end portion (e.g., below) the base cylinders 355. Each of the arms 364 of the piston head member 354 acting within the base cylinders 355 receive pressure from the working fluid (WF), and then transfers the pressure via the piston head member 354 to drive the piston head 382 which increases the pressure within the compression chamber 165. In such embodiments, the arms 364 of the piston head member 354, which can be a single component, act within the corresponding base cylinders 355 and the drive piston head portion 382 acts within the drive cylinder 357. As shown in FIGS. 3A and 3B, the drive piston head portion 382 can have a smaller cross-sectional dimension (e.g., diameter) than those of the individual arms 364, e.g., to increase the pressure applied to the compression chamber 165. In some embodiments, the cross-sectional dimension of the drive piston head portion 382 is equal to or larger than those of the individual arms 364, depending on the desired pressure to be applied via the drive piston head portion 382 to the compression chamber 165. As also shown in FIGS. 3A and 3B, the pressure concentrator 150 includes four cylinders 355, however in other embodiments the pressure concentrator 150 can include more or fewer base cylinders (e.g., 2, 6, 10, etc.), depending on the desired pressure to be applied to the compression chamber 165. Each of the base cylinders 355 can include, in addition to a corresponding portion of the piston head member 354, a first compartment 370 above the corresponding portion of the arms 364 of the piston head member 354, a second compartment 372 below the corresponding arms 364 of the piston head member 354, and a biasing member 374 (e.g., a spring) within the second compartment 372 and configured to apply a biasing force (e.g., an upward biasing force) on the corresponding arms 364 of the piston head member 354 in a direction away from the compression chamber 165. The individual base cylinders 355 can further include first and second piston shear pins 366, 368 configured to limit and/or enable movement of the piston head member 354 and/or the corresponding arms 364, a bleed line 360 fluidically coupled to the second compartment 372 via a pressure relief valve 361, and a fill line 362 fluidically coupled to the first compartment 370 via a working fluid (WF) valve 363.

As shown in FIGS. 3A and 3B, the pressure intensifier 140 can further include a drive interface 384 between the compression chamber 165 and a bottom face of the drive piston head portion 382 of the drive cylinder 357. As previously described, the pressure of the working fluid (WF) applies pressure to the drive piston 382 via each of the individual base cylinders 355. The drive piston 382 can exert a pressure equal to or approximately equal to (e.g., within 10%) the sum of the pressures provided by the individual pistons of piston head members 354. In some embodiments, the drive interface 384 can comprise a piezoelectric material or other related material configured to convert compression energy into electrical energy. For instance, in such embodiments comprising a piezoelectric material, the material can produce pulsed electrical current, which can be transferred via wires to a load for utilization, e.g., within the system 100.

In operation, the pressure intensifier 140 is configured to convert hydrostatic pressure from the stored fluid in the tank 105 and/or from the fluid pressure developed from the pneumatic pressure source 110 to the working fluid (WF) for further utilization. As previously noted, the pressure intensifier 140 is shown in FIG. 3A in a depressurized state and is shown in FIG. 3B is in a more pressurized state. Before hydraulic pressure from the stored fluid of the tank 105 is transferred to the pressure intensifier 140, the pressure intensifier 140 is filled with the working fluid (WF), e.g., via the working fluid (WF) source 115. As such, the second compartment 146 of the pressure intensifier 140, the first compartments 370 of the individual base cylinders 355, the connecting conduit 116, and the separator compartment 272 up to the separator piston member 254 (shown in FIG. 2) are fluidically coupled to and each filled with the working fluid (WF). As the pressure intensifier 140 is being filled with the working fluid (WF), (i) the first separator shear pins 266 hold the separator piston member 254 in place as shown in FIG. 2, and (ii) the first piston shear pins 366 hold the individual piston heads 354 in place, such that pressure from the stored fluid and/or tank 105 is not transferred to the pressure intensifier 140 while the pressure intensifier 140 is being filled with the working fluid (WF). The second compartments 372 of the individual base cylinders 355 are not filled with the working fluid (WF) and contain air. The air in the second compartments 372 of the individual base cylinders 355 is released via pressure relief valve 361, e.g., while the piston arm member 354 moves toward the compression chamber 165.

After the pressure intensifier 140 is filled with the working fluid (WF) and prior to applying the hydraulic pressure from the tank 105 or the pneumatic pressure from the pressure source 110 to the pressure intensifier 140, the base interface 144 can be positioned toward the top of the pressure intensifier 140 and the biasing members 374 can be uncompressed or slightly compressed state, as shown in FIG. 3A. Once the pressure intensifier 140 is filled with the working fluid (WF), the first separator shear pins 266 that hold the separator piston member 254 in place are released (see FIG. 2). In doing so, hydraulic pressure from the tank 105, or more specifically from the bottom portion of the tank 105, is applied to the pressure intensifier 140 via the separator piston 120 (FIG. 2). Once the pressure intensifier 140 reaches a pressure equilibrium with the connecting conduit 116, the separator piston 120 can be isolated from the pressure intensifier 140, e.g., by closing the second inlet valve 318. Additionally, as shown in FIG. 2, the separator outlet valve 220 can be closed and the second separator shear pins 268 can engage the separator piston member 254. At this juncture the shear pins 366 can be disengaged from the individual base cylinders 355, enabling drive piston 382 to apply pressure on compression chamber 165. Additional pneumatic pressure can be applied to chamber 148 by opening valves 310, further enabling drive piston 382 to apply pressure to compression chamber 165.

Afterward, pneumatic pressure provided via the pressure intensifier inlet conduit 112, e.g., from the pressure source 110 is applied to the pressure intensifier 140, or more specifically to the portion of the base interface 144 exposed to the first compartment 148, by opening the first inlet valves 310*a/b*. As such pressure is applied, the base interface 144 is forced toward the pressure concentrator 150 and/or the compression chamber 165, thereby causing the pressure within the second compartment of the pressure intensifier 140 to increase. In some embodiments, pressure delivered from the pressure source 110 exceeds a pressure threshold in the first compartment 148 to move the drive interface 144 and/or the drive piston 382 against the compression chamber 165. After pressure from the pneumatic source 110 is sufficient to have enabled the first compartment 148 to overcome the threshold pressure in the second compartment 146, the first shear pins 366 are removed from the individual base cylinders 355, thereby enabling the portions of the piston head member 354 of each of the individual base cylinders 355 to move toward the compression chamber 165 and compress the corresponding biasing members 374, as shown in FIG. 3B. In doing so, the collective pressure within the individual base cylinders 355 can be transferred to the drive piston head portion 382, which pressurizes the compression chamber 165. Once the applied pressure of the pressure intensifier 140 has brought the compression chamber 165 to the desired pressure, second piston shear pins 368 can engage the portions of the piston head member 354 to hold the piston head member 382 in place, e.g., while other processes at the compression chamber 165 and the manifold 170 are carried out. In some embodiments, the compression chamber outlet valve 368 at the outlet of the compression chamber 165 can be closed after pressurization to enable simultaneous decompression into one or more plasma reactors (which may be in the form of radiant energy transfer (RET) modules and/or eRET modules or other suitable reactors that utilize the internal energy of water to help break its O—H bonds), while products of pressurization are processing in and/or from the compression chamber 165. The compressed fluid (CF) in the compression chamber 165 is fluidically isolated from the working fluid (WF) in the second compartment 146.

In some embodiments, the pressure intensifier 140 can include a preheater 385 (e.g., a solar preheater) that utilizes solar energy to preheat fluid before compression in the compressed fluid (CF). The preheater 385 can include a heat exchanger and/or can be in fluid communication with the compressed fluid (CF) of the compression chamber 165 via preheater conduit 386. Preheating the fluid before becoming compressed fluid (CF) can increase the energy extracted from the compressed fluid (CF), thereby enabling downstream units and/or processes to produce additional energy.

In some embodiments, the pressure intensifier 140 can include a package 365 comprising products to be pressurized (e.g., food, equipment, parts, materials, etc.) that can be beneficially processed via the high pressures of the compressed fluid (CF). For example, the package 365 in the compression chamber 165 can enable high pressure food processing, biomass conversion (e.g., to biocrude), hydroforming of parts and materials, synthetic diamond production, expanding windmill output capacity, and/or electricity generation (e.g., for piezoelectric materials). The package 365 can be contained within compression chamber 165, or can be external to the compression chamber 165 and fluidically coupled to the compression chamber 165. The package 365 can facilitate pretreating of biomass, e.g., for conversion into green hydrocarbon fuels, high pressure food processing, hydroforming of parts and materials, synthetic diamond production, and potentially many other products of pressurization.

Once the individual piston head portions of the individual base cylinders 355 have reached the bottom of their travel, as shown in FIG. 3B, the pressure intensifier 140 and the separator piston 120 (FIG. 2) can be depressurized and re-set so the pressurization cycle can be run again for a new cycle. To re-set the pressurization cycle, the second inlet valve 318 can be opened to allow the working fluid (WF) to fill the second compartment 146. The separator piston 120 (FIG. 2) can be isolated (e.g., the from the storage tank 105 (FIG. 1) and pressure intensifier 140) by closing separator inlet and outlet valves 218, 220, and the pressure in the separator piston 120 can be relieved via pressure relief valve 222. In doing so, the separator piston head member 254 can be reset to its initial (e.g., depressurized) position. As the separator piston member 254 is reset and moves toward closed separator inlet valve 218, fluid within the first separator compartment 270 is removed from the system 100, e.g., via pressure relief line 260. Once the separator piston member 254 is reset to its starting or unpressurized position, the pin 266 can engage the separator piston member 254 and the pressure relief valve 222 can be closed.

For the pressure intensifier 140, the air pressure in the second compartments 372 of the individual base cylinders 355 is first relieved, e.g., via the corresponding pressure relief valves 361 and pressure relief lines 360. Subsequently, the first compartments 370 and the second compartments 372 of the individual base cylinders 355 can be equalized, thereby causing the working fluid (WF) to flow to the second compartments 372, which were previously filled with air, from the first compartments 370. After the first compartments 370 and the second compartments 372 of the individual base cylinders 355 are filled with the working fluid (WF), the shear pins 368 can be released and disengaged from the base piston head portions, thereby causing piston head member 354 within the individual base cylinders 355 and/or pressure concentrator 150 to move to its starting (e.g., default or unpressurized) position. At this point, the compression chamber 165 is considered depressurized. In the default position, the first piston shear pins 366 can engage the base piston head portions. Additionally, the first inlet valves 310*a-b* of the first compartment 148 of the pressure intensifier 140 are closed and the pressure in the first compartment 148 is relieved, e.g., via first compartment pressure relief valve 321. The working fluid (WF) in the second compartments 372 of the individual base cylinders 355 can be removed, via pumps (not shown) or other means. At this point, the pressurization cycle of the pressure intensifier 140, as described herein, can begin again.

Figure 4:
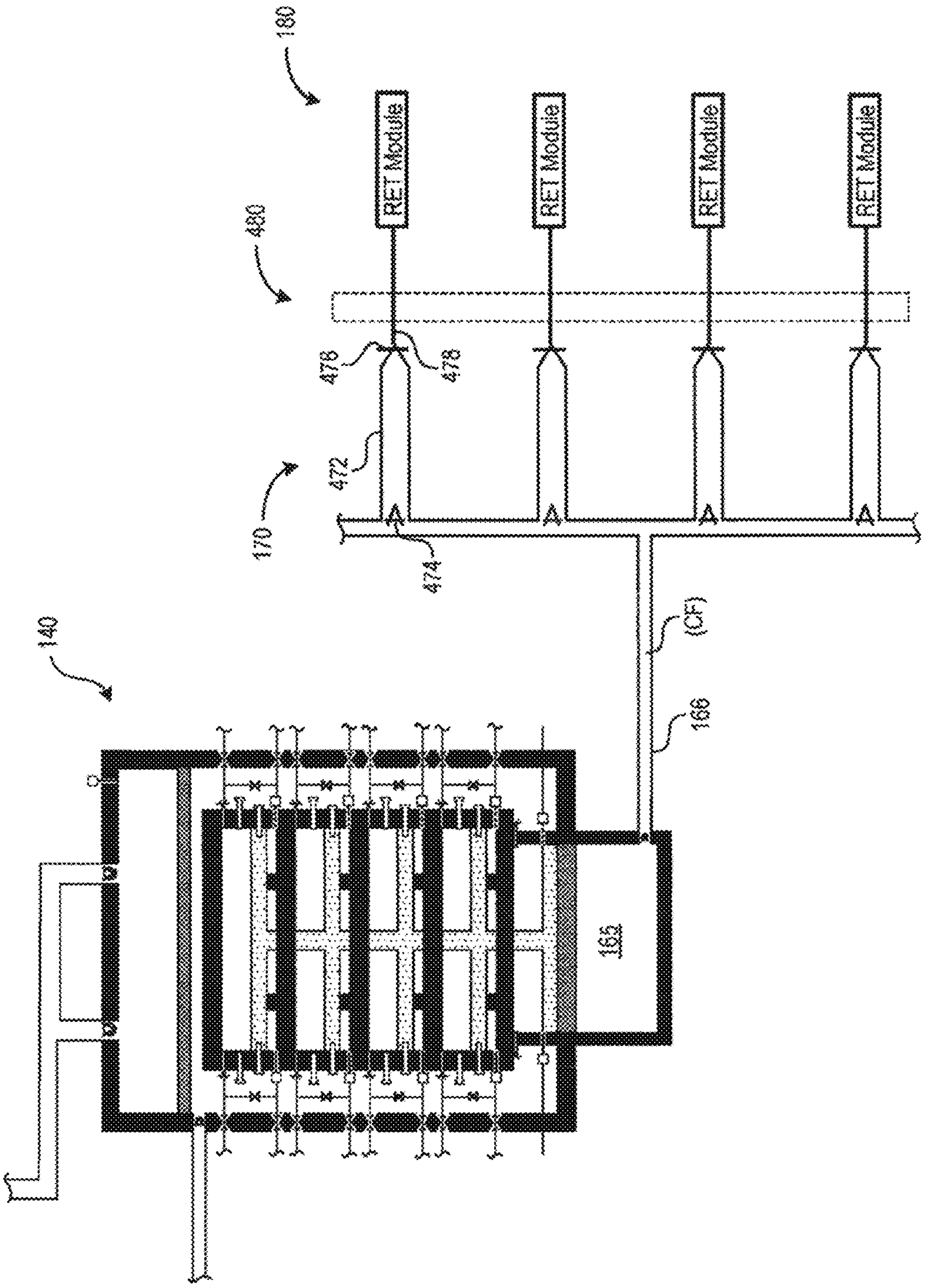
FIG. 4 is a schematic cross-sectional view of the manifold and plasma reactors or modules of the embodiment of FIG. 1.

FIG. 4 is a schematic cross-sectional view of an embodiment of the manifold 170 of FIG. 1. As shown in FIG. 4, the manifold 170 is positioned to receive the compressed fluid (CF) from the compression chamber 165 of the pressure intensifier 140 via compression chamber conduit 166. The manifold 170 can include one or more secondary compression chambers 472. (e.g., at least 10 chambers, 50 chambers, 100 chambers, or 200 chambers) Systems can be designed to utilize as many chambers as desired. Each chamber having a channel inlet valve 474 and a channel outlet valve 476, such that individuals chambers 472 can be isolated from the other chambers 472 and the conduit 166. The individual chambers 472 can have a cylindrical shape, with a diameter of whatever length is desired. Individual 472 chambers can be whatever length is desired. Chambers 472 can be any shape, size and/or configuration desired. For example and without limitation, in some embodiments the chambers 472 may have a diameter of no more than one inch (e.g., 0.25 inch, 0.5 inch, or 0.75 inch), and/or a length of at least two inches (e.g., 3 inches, 4 inches, 5 inches, or 10 inches). Pressure within the individual chambers 472 can be at least 1,000 psi, 3,000 psi, 5,000 psi, 10,000 psi, 50,000 psi, 100,000 psi, or more. The manifold 170 can further include a plurality of channels 478, each downstream of a corresponding chamber 472. The individual channels 478 can have a smaller cross-sectional dimension (e.g., diameter) than that of the chambers 472, and in some embodiments can be fine bore friction channels comprising graphene, carbon nano tubes, and/or carbon nano materials, or they can be made from conventional materials such as metals, glass, ceramic, etc. In some embodiments, individual channels 478 can have an interior circular-profile diameter of no more than 1 inch or more, or the diameter can be 0.8 nm or smaller. (e.g., 0.25 inch or 0.5 inch). The compressed fluid (CF) flowing through the channels 478 can depressurize and/or generate heat, causing the compressed fluid (CF) to vaporize and form steam which can be utilized to produce additional work. For example, in some embodiments a mechanical conversion device or system 480 ("conversion device 480") can be integrated within the manifold 170 and utilized to convert the energy in the steam to electricity or mechanical work. The conversion device 480 can be constructed in accordance with state-of-the-art impeller type steam to rotational energy conversion devices, or such that the steam vapor discharged from the channels 478 drives the conversion devices 480 into rotational motion.

Steam vapor can discharge from the conversion device 480 to the plasma reactors 180 positioned downstream of the manifold 170. As such, the plasma reactors 180 can be configured to receive the decompressing fluid (previously the compressed fluid (CF)), which at that point may include water vapor or steam. In some embodiments, the plasma reactors 180 may be provided in the form of RET modules and/or eRET modules which may be configured to disassociate the steam and/or decompressed fluid (CF), e.g., into hydrogen (H.sub.2) and oxygen (O.sub.2). In such embodiments, the disassociated products can be further utilized, e.g., by directing them to fuel cells and/or combusting them for energy generation.

Figure 5:
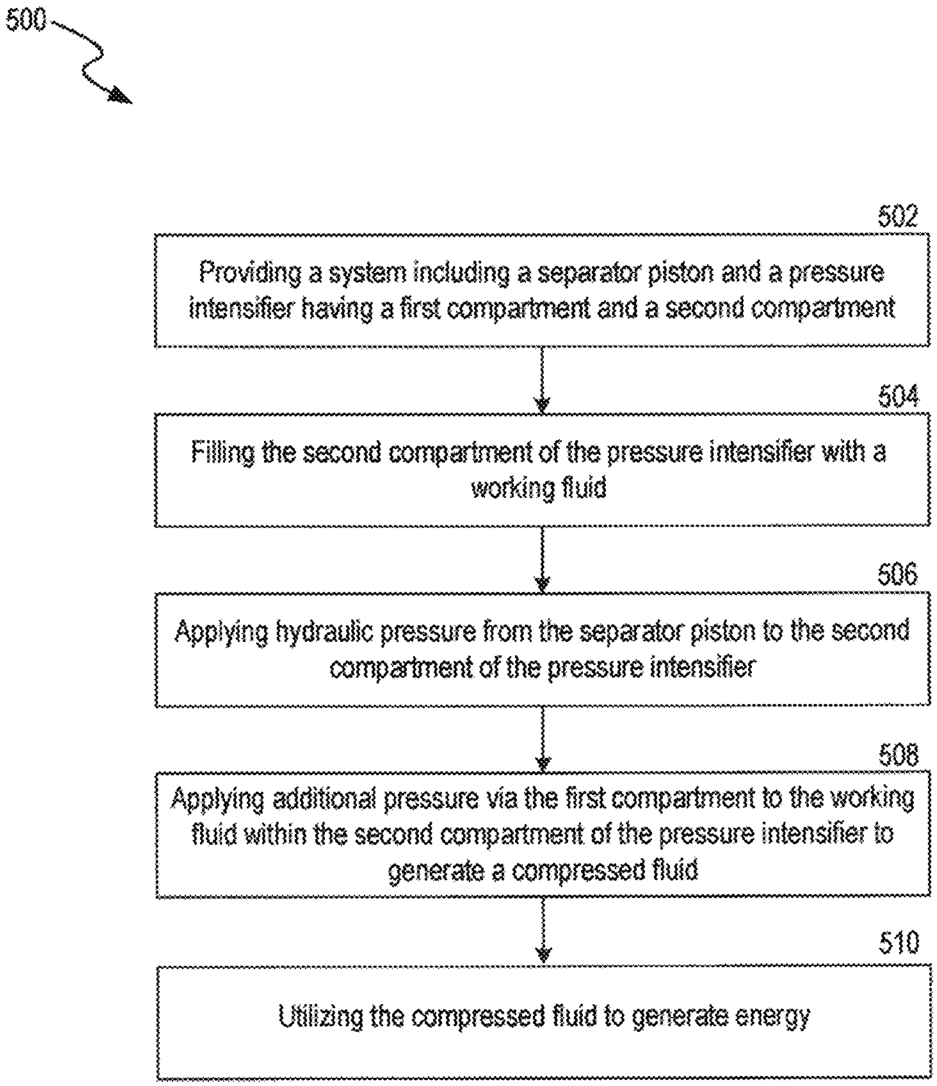
FIG. 5 is a block flow diagram of a method for utilizing hydrostatic and hydraulic pressure, in accordance with embodiments of the present technology.

FIG. 5 is a block flow diagram of a method 500 for utilizing hydrostatic and hydraulic pressure to generate energy, in accordance with embodiments of the present technology. The method 500 includes providing a system (e.g., the system 100; FIG. 1) including a separator piston (e.g., the separator piston 120; FIGS. 1 and 2) and a pressure intensifier (e.g., the pressure intensifier 140; FIGS. 1, 3A, and 3B) having a first compartment (e.g., the first compartment 148; FIGS. 1, 3A, and 3B) and a second compartment (e.g., the second compartment 146; FIGS. 1, 3A, and 3B) (process portion 502). The separator piston can include a first separator compartment (e.g., the first separator compartment 270; FIG. 2) fluidically coupled to a bottom portion of a storage tank (e.g., the tank 105; FIG. 1) having a hydraulic pressure, and a second separator compartment (e.g., the second separator compartment 272; FIG. 2) fluidically coupled to the pressure intensifier and fluidically isolated from the first separator compartment. The pressure intensifier can include a pressure concentrator (e.g., the pressure concentrator 150; FIGS. 1, 3A, and 3B) including a housing (e.g., the housing 352; FIGS. 3A and 3B), a piston head member (e.g., the piston head member 354; FIGS. 3A and 3B), a plurality of base cylinders (e.g., the base cylinders 355; FIGS. 3A and 3B) at least partially defined by the housing and the piston head member, and a drive piston head portion (e.g., the drive piston head portion 382; FIGS. 3A and 3B) abutting a compression chamber (e.g., the compression chamber 165; FIGS. 1, 3A, 3B, and 4). Each of the cylinders can include a first compartment (e.g., the first compartment 370; FIGS. 3A and 3B), a second compartment (e.g., the second compartment 372; FIGS. 3A and 3B) spaced apart from the first compartment of the corresponding piston, and a biasing member (e.g., the biasing member 374; FIGS. 3A and 3B) exerting a force against the portion of the piston head member in a direction toward the first compartment of the corresponding piston.

The method 500 further comprises filling the second compartment of the pressure intensifier with a working fluid (WF) (process portion 504). The working fluid (WF) (e.g., water) can be supplied via a working fluid source (e.g., the working fluid source 115; FIG. 1), e.g., positioned at a conduit extending between the pressure intensifier and the second separator compartment of the separator piston. The pressure intensifier can be isolated from the working fluid source, e.g., via the second inlet valve 318 on the connecting conduit 116. Filling the second compartment can include filling the entire area of the second compartment outside of the pressure concentrator, and the first compartments of the pistons of the pressure concentrator. The second compartments of the pistons of the pressure concentrator are not filled with the working fluid and instead contain air, which is released during operation of the pressure concentrator and/or pressure intensifier. The first compartments of the pressure concentrator can be filled via working fluid (WF) fill lines.

In some embodiments, as the second compartment of the pressure intensifier is filled with the working fluid (WF), the separator piston member (e.g., the separator piston member 254; FIG. 2) is locked in place, e.g., via separator shear pins (e.g., the second separator shear pin 266; FIG. 2), such that the separator piston member is prevented from moving within the separator piston and thereby prevented from transferring the pressure of the fluid in the first separator compartment to the second separator compartment, which is or can be fluidically coupled to the second compartment of the pressure intensifier. Additionally, the portions of the piston head member that form the piston head for each of the individual pistons can be locked in place, e.g., via first piston shear pins (e.g., the first piston shear pin 366; FIGS. 3A and 3B), such that the piston head member is prevented from moving within the pressure intensifier during the filling.

The method 500 further comprises applying hydraulic pressure from the separator piston to the second compartment of the pressure intensifier (process portion 506). Applying the hydraulic pressure from the separator piston can comprise releasing the separator piston member from a locked position and/or disengaging the separator shear pin(s) from the separator piston member. In doing so, the higher pressure of the fluid in the first separator compartment forces the separator piston member toward the second separator compartment, thereby increasing the pressure of the working fluid (WF) in the second separator compartment and the pressure intensifier. Stated differently, the pressure in the pressure intensifier equalizes with the pressure of the fluid in the first separator compartment, which can correspond to the pressure from the bottom portion of the storage tank. After the pressures are equalized, the pressure intensifier can be isolated from the separator piston, e.g., by closing a valve (e.g., the second inlet valve 318; FIGS. 3A and 3B) of the inlet conduit extending from the separator piston to the second compartment of the pressure intensifier.

The method 500 further comprises applying additional pressure via the first compartment of the pressure intensifier to the working fluid (WF) within the second compartment of the pressure intensifier to generate a compressed fluid (CF), e.g., within the compression chamber (process portion 508). A source of the additional pressure of the first compartment can be a pneumatic pressure source (e.g., the pressure source 110; FIG. 1). In some embodiments, the pressure of the pneumatic pressure source is isolated from the first compartment of the pressure intensifier, e.g., via one or more valves (e.g., the first inlet valves 310*a-b*; FIGS. 3A and 3B). In such embodiments, applying the additional pressure from the pneumatic pressure source can comprise opening the one or more inlet valves such that the first compartment is fluidically coupled to the pneumatic pressure source. During or after applying the additional pressure to the working fluid (WF) within the second compartment, the portions of the piston head member that form the piston head for each of the individual pistons can be released, e.g., by disengaging the corresponding shear pins, such that the piston head member can move within the pressure intensifier in response to the pressure exerted via the hydraulic fluid pressure and/or the additional pressure from the first compartment of the pressure intensifier. Additionally, after the piston head member moves (e.g., downward toward the compression chamber) to a compressed position, the piston head member (e.g., the portions of the piston head member forming piston heads of individual pistons) can be locked in the compressed position. In doing so, the pressure applied via the pistons and/or the drive piston head portion is maintained, e.g., until the compression chamber is depressurized and/or the compressed fluid (CF) is released from the compression chamber.

The method 500 further comprises utilizing the compressed fluid (CF) to generate energy (process portion 510). As described herein, the system can include an interface (e.g., the interface 384; FIGS. 3A and 3B) within the compression chamber and configured to receive the pressure exerted via the arms of the piston head member. The interface can comprise a piezoelectric material. In such embodiments, utilizing the compressed fluid (CF) to generate energy can also comprise generating energy or current via the piezoelectric material.

Figure 11:
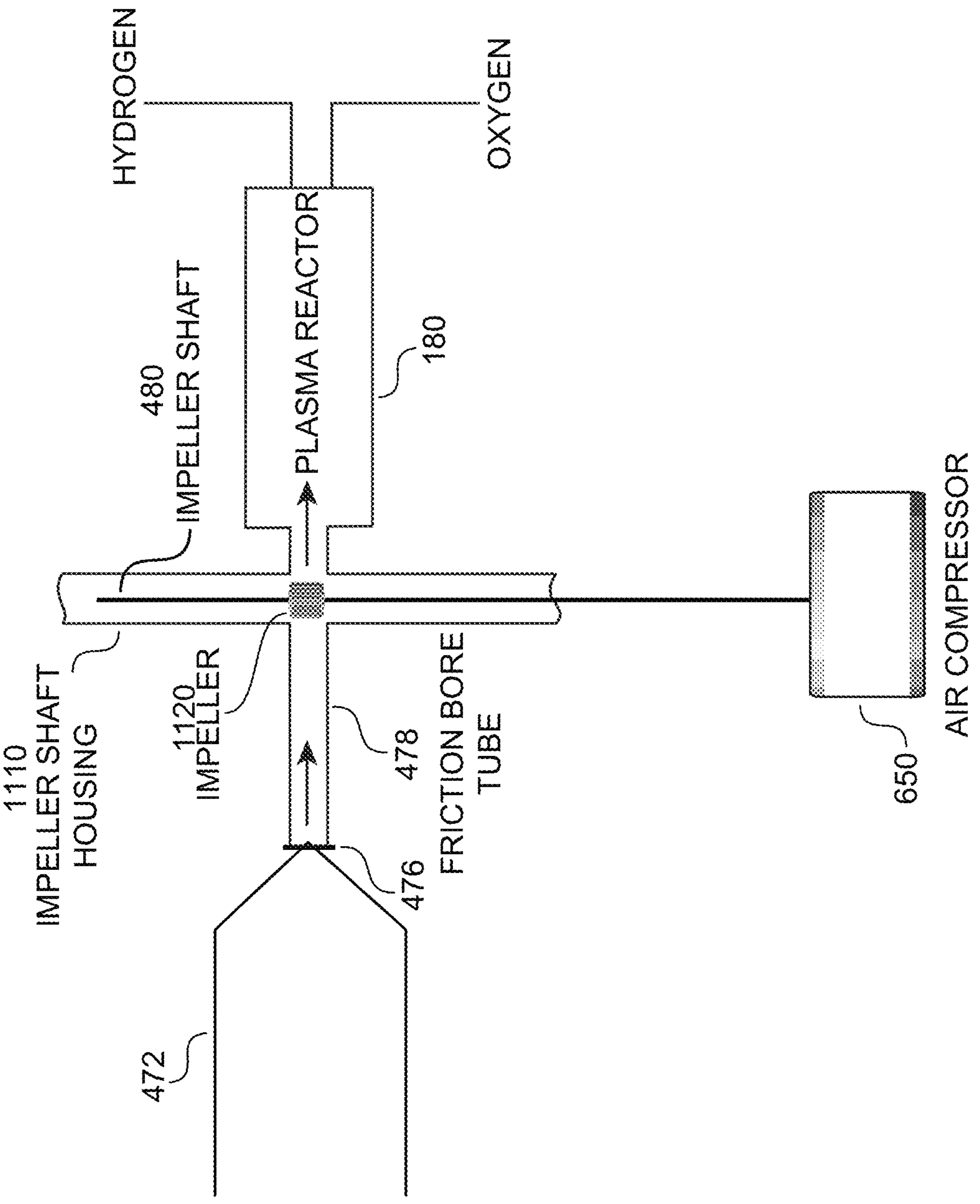
FIG. 11 is a schematic cross-sectional view of an embodiment showing decompressing water vapor and or steam through a friction channel and impeller shaft.

As also described herein, the system can comprise a manifold (e.g., the manifold 170; FIGS. 1 and 4) comprising a plurality of chambers (e.g., the chambers 472; FIG. 4) and a plurality of friction channels (e.g., the friction channels 478; FIG. 4 and FIG. 11). In such embodiments, utilizing the compressed fluid (CF) from the compression chamber to transfer hydraulic pressure can comprise directing the compressed fluid (CF) to the chambers and the channels to decompress the compressed fluid (CF) to generate water vapor and/or steam. Moreover, the system can further comprise a plurality of plasma reactors (e.g., the plasma reactors 180; FIGS. 1 and 4) downstream of the channels that is configured to disassociate the steam into at least one of hydrogen or oxygen, which can be combusted and/or directed to electrochemical cells for electricity generation.

In some embodiments, the method 500 can further include depressurizing the second compartment of the pistons of the pressure intensifier by fluidically isolating the pressure intensifier from the separator piston and equalizing the pressures of the first compartments and the second compartments of each of the cylinders of the pressure concentrator. In doing so, pressurized air from the second compartments of the pistons is bled off and water fills the second compartments of the pistons, until both the first compartments and the second compartments of each of the cylinders are full of water. In doing so, the corresponding portions of the piston head member that form the piston heads for the pistons is forced upward and/or away from the compression chamber via the biasing members. In some embodiments, the piston member is constructed of a buoyant material which works in conjunction with the biasing members to float the piston member to its starting position. Additionally, the separator piston can be depressurized and the separator piston member can be locked in place.

The method 500 can further comprise recharging the system to prepare the system to be repressurized via the hydraulic pressure of the storage tank via the separator piston, as described with respect to process portion 506. In such embodiments, after the buoyant piston head member, working in conjunction with the biasing members, has moved the piston head member to its uncompressed or less compressed starting position, shear pins can be re-engaged into the piston head member. Fluid in the second compartments of the pistons cylinders can be removed such that the second compartments contain mainly air. In such embodiments, the fluid in the second compartments of the pistons can be removed such that the second compartments contain mainly air, and the piston shear pins can be disengaged from the piston head member to enable the biasing members to push the corresponding portions of the piston head member (e.g., upward) to uncompressed or less compressed positions. In such positions, the pressure intensifier can be filled with the working fluid (WF), if needed, as described herein for process portion 504. Once the system is recharged, the system can be repressurized to generate additional compressed fluid (CF) that can be decompressed through friction channels, orifices, and/or valves to generate frictional heat energy, as described herein for process portion 508.

As illustrated in an example shown in FIG. 6, embodiments of the present invention may be placed under water. These embodiments may be utilized to convert the potential energy of hydrostatic pressure that is resident within bodies of water into hydrogen and oxygen. After being produced, this hydrogen and oxygen can be brought to the surface. FIG. 6 discloses an exemplary embodiment of a method and system for bringing the produced hydrogen and oxygen to the surface. In some of these embodiments, the water that is used to drive the intensifier (drain water) may be brought to the surface or to be pressurized against the hydrostatic pressure which resides at the depth where the intensifier system is located. The example of FIG. 6 presents a method and system for bringing the water that is used to drive the intensifier to the surface, or to pressurize it against the pressure that is resident at the depth where the intensifier and system is located, after it has done the work of driving the intensifier. However, in alternative embodiments, the drain water may be released from inside the system to the outside water surrounding the system as air is brought back into chambers 372 at the beginning of a new cycle.

When embodiments of the present invention are operated under water, the separator piston of FIG. 2 that is utilized to keep oil (or other fluids) that are within fluid storage tanks from co-mingling with water in the intensifier, may not be necessary. These embodiments can be immersed in both fresh and salt bodies of water, and the pressure driving the intensifier can come exclusively from the hydrostatic pressure that is in a body of water and/or it can be combined with pneumatic pressure from external sources (such as the pneumatic pressure source 110 shown in FIG. 1). Other external sources of pneumatic pressure can come from, without limitation, wave powered pneumatic pumps, windmills, or any other sources of pneumatic pressure.

In some embodiments, pneumatic air pressure can be supplied to chamber 148 though line 112 and valves 310*a*, 310*b*. Fluid pressure can enter the intensifier through line 116 and valve 318. In some embodiments, if external pneumatic pressure is not applied to the intensifier, then valves 310*a*, 310*b* and 321 can be closed or eliminated, and lines 112 can also be eliminated; and piston 144 can float, or not be included in the design.

Referring to FIGS. 3A, 3B and 6, it is seen that initial hydrostatic fluid pressure enters intensifier 140 through line 116, valve 318 and into chamber 146 and into chambers 370. Initial hydrostatic fluid pressurized within chamber 146 is fluidly connected with cylinders 355*a-d* through valves 363 to chambers 370 above each arm 364*a-d* of piston heads arm member 354. When initial fluid pressure enters intensifier 140, chambers 372 which are below each arm of the piston member 354 are filled with air.

During each cycle of operation, as fluid pressure enters chambers 370 the air in chambers 372 is evacuated through valve 361, line 360. Thus, the pressure of the fluid above each arm 364*a-d* moves piston heads arm member 354 downward, moving drive piston 382 downward, thereby compressing the fluid (CF) in chamber 165. For above-water operations, the air from chambers 372 may simply be released to the outside atmosphere. For below-water operations such as those shown in FIG. 6, this air may be sent to line 620 which is attached to line 640 leading to the surface. Referring to FIG. 6, it is seen that line 620 can be integrated into the pneumatic system that drives piston 670. Alternately, air from chamber 372 can be incorporated into pneumatic system 600, FIG. 6. Air may be pulled from above the water level through line 640 using a pneumatic compressor pump 650. When the system is placed in fresh water, in some embodiments drain water from the intensifier 140 can be pumped through line 624 by pump 626 through valve 622 and into chamber 165 where it may later be pressurized and separated into hydrogen and oxygen in a subsequent cycle. In some embodiments, this drain water may be filtered before entering chamber 165. As shown in FIG. 4, chamber 165 is fluidly connected to chambers 472, through fluid line 166.

As described above, the combined force from all pistons of piston arms member 354 is applied through drive piston 382 to compress fluid within compression chamber 165. Compression chamber 165 is fluidly connected downstream through valve 368, line 166, and valves 474 leading to secondary compression chambers 472 and ending at valves 476 as shown in FIG. 4. As initial fluid pressure enters intensifier 140, valves 368 and 474 are open, and valves 476 are closed, allowing compressed fluid (CF) from chamber 165 to travel through line 166 and into secondary compression chambers 472. After, this water has been charged with fluid pressure (CF) from drive piston 382 (i.e., drive piston 382 has been moved to the lowest position that the fluid pressure of intensifier 140 will move it), valve 368 and valves 474 are then closed. This isolates the pressurized fluid within the secondary chambers 472. Pressurized fluid within 472 is then accelerated by opening valves 476. This decompresses the fluid (water) as it enters the plasma reactors 180 where it is separated into oxygen and hydrogen.

In some embodiments, as part of this process, the compressed fluid (CF) may be passed from valves 476 through fine bore friction channels, orifices, and/or valves 478 (described below), and then through impeller shaft 480 and into plasma reactor modules 180. The plasma reactor modules 180 separate the decompressing water into hydrogen and oxygen.

By way of example and without limitation, fluid in chambers 472 can be pressurized to upward of 100,000 PSI. Valves 476 are then opened allowing the highly pressurized fluid to decompress through fine bore friction channels, and orifices, 478 and valves 476 as shown in FIG. 11. The pressure difference between the highly pressurized fluid in the compression chambers 472 and the near atmospheric pressure in housing 1110 surrounding impeller shaft 480 and in plasma reactors 180 causes the decompressing fluid to accelerate through the fine bore friction channels 478, raising the temperature of the fluid to become water vapor and or steam. This also causes impeller 1120 on shaft 480 to rotate, providing rotational motion that may be used, for example to drive air compressor 650 discussed below. The hydrostatic pressure within fluid compression chambers 472 can range from 3,000 psi to 100,000 psi or higher. Fine bore friction channels 478 can have a circular interior cross-sectional profile or any other geometrical interior cross-sectional profile. The friction channels can be manufactured from a wide range of materials (glass, metals, ceramics, graphene, nano carbon materials and/or any other materials and/or from any composite materials) The interior surface of the fine bore friction channels can be rough, to facilitate greater production of frictional heat as the decompressing fluid is accelerated through the friction channels. The interior surface of fine bore friction channels, orifices, and valves can be treated by vapor deposition, plating, or any other materials treatment process that is used to facilitate frictional heat generation within the channels. Interior dimensions of the friction channels can be in the micron region ($10^{-6}$ m) and down to the nanoscale region ($10^{-9}$ m). Or they can be as large as 1/32-inch, 1/4-inch, 1/2-inch, 1 inch, 2 inches, 3 inches or larger, and/or any size between.

Referring to FIG. 6, it is seen that the hydrogen exiting the plasma reactors 180 may rise through line 610 to the surface, and then be pumped by pump 695 into one or more hydrogen storage units, such as a tank 696. Similarly, oxygen exiting from the plasma reactors 180 may rise to the surface, and then be pumped by pump 689 into a storage tank 690.

In some embodiments, steam operated impeller shaft 480 may drive air compressor 650, which drives the pneumatic system that controls piston 670. In these embodiments, air may be drawn from above the water surface through line 640 and into the pneumatic system which moves the oxygen produced by the plasma reactor modules 180 together with used drain-water from the intensifier to an oxygen-water separator 685 which is located near the surface of the body of water. From the oxygen-water separator 685 oxygen pump 689 moves the oxygen into a storage system, such as tank 690. In some embodiments, intensifier drain water pump 647 may move the used drain water from the intensifier to cylinder 675. Simultaneously with this, oxygen pump 656 moves oxygen from the plasma reactors 180 to cylinder 675. To reduce the amount of energy required to pump oxygen and drain water into cylinder 675, the fluid pressure in cylinder 675 may be reduced by moving piston 670 down so that it increases the volume capacity of cylinder 675. This is accomplished by simultaneously closing exit valve 677 and opening valves 664, 662, 652 (in some embodiments valve 661 can also be opened); closing valve 651; and pulling air from cylinder 665 through valve 652 and line 654 by utilizing air compressor 650. Then, with piston 670 in a lower position to receive a maximum volume capacity of oxygen and intensifier drain water into cylinder 675, valves 652, 664, 662 may then be closed. Cylinder 675 is charged with oxygen using pump 656 and with intensifier drain water using pump 647. Valves 677 and 651 are then opened. The co-mingled oxygen & drain water in cylinder 675 are then forced up line 680 by pneumatic pressure from compressor 650 that is applied to piston 670 from air chamber 665. Then, co-mingled oxygen and drain water from line 680 enter a water-oxygen separator 685. Oxygen is separated out and pumped into oxygen storage tank 690 by pump 689. Water is released from the water-oxygen separator 685 at the surface of the body of water.

Air compressor 650 can be utilized to supply the pneumatic pressure for driving this system. Pneumatic valves within various air lines can be systematically opened and closed to direct and control air pressure to the various functions of the system. Pneumatic pressure can be utilized to move piston 670 which controls the fluid pressure within chamber 675, and which can apply pressure for driving the oxygen-water mixture up line 680 to oxygen separator 685. Pneumatic pressure can be utilized for evacuating cylinder 372 during operation of intensifier 140. Pneumatic pressure can be utilized for pressurizing cylinder 372 during the reset cycle of intensifier 140. If necessary, pneumatic pressure can be utilized to assist with moving piston arm members 354 to its starting position during the reset cycle by applying pressure against drive piston 382 from within chamber 165. Pneumatic pressure can be utilized to drive desalination module 623, when the system is operated in salt water. Collectively the various functions within the system requires timing when receiving or delivering pneumatic pressure at various volumes, rates, and intensities. Pneumatic accumulator 660 can be utilized to stabilize pressure fluctuations to facilitate proper delivery of air pressure to the various components of the system. For under water embodiments which utilize pneumatic pressure source 110 in conjunction with the hydrostatic pressure that is within bodies of water to drive the intensifier, pneumatic pressure source 110 can be incorporated into driving the various pneumatic system functions of FIG. 6, along with air compressor 650.

In some embodiments, pump 626, line 624, and valve 622 may be used when the system is submerged in fresh water. In such embodiments, pump 626 is used to move fresh water that was used to drive the intensifier to compression chamber 165 through valve 622. When the combined volumes of chamber 165, conduit 166, chambers 472, are charged to maximum volume capacity, then the remaining drain water that was used to drive the intensifier in a given cycle may be pumped from the intensifier through line 645 by pump 647 through valve 659 and into chamber 675.

In embodiments when the system is submerged in salt water, a desalination module 623 may be included in the design. For such saltwater applications, pump 626, line 624, and valve 622 can be eliminated. For saltwater applications some of the drain water from the intensifier is pumped to the desalination module through lines 645 and 630, and then from the desalination module 623 a volume of the desalinated fresh water is pumped into chamber 165, which is fluidly connected to the chambers 472, through valve 368, valves 474, and fluid line 166 as shown in FIG. 4.

In embodiments of the invention, the volume of water used to drive the intensifier, per cycle, can be larger than the volume of water, which is required to fill the combined chamber 165, chambers 472 and connecting fluid line 166. For saltwater applications this volume of water is supplied from desalination module 623. After each cycle when chamber 165, chambers 472 and connecting fluid line 166 are filled with the required volume of water, the additional intensifier drain water bypasses the desalination module 623 and is pumped directly through line 645 by pump 647 to cylinder 675. Desalination unit 623 (FIG. 6) can be driven by pneumatic pump 650. (FIG. 6) Pneumatic pump 650, hydraulic pumps 647 and 638 can work in conjunction to move water between cylinder 675, desalination module 623, compression chamber 165 and intensifier 140.

After a volume of hydrogen and oxygen has been separated, the system may be reset for another separation cycle. The re-set cycle starts after pressurized water in chambers 472 has decompressed through friction channels 478, through impeller shaft 480 and into plasma reactor modules 180 to produce hydrogen and oxygen shown in FIG. 4. First, valves 476 are closed, shear pins 368 are released, chamber 165, line 166, and chambers 472 are simultaneously re-filled with fresh water. Biasing springs 374 decompress, working in conjunction with floating buoyant piston arm member 354, moving arm member 354 upward to its starting position. The piston arm members 354 (and members 364) may be made from a buoyant material, or from a strong composite of materials, that have a density that is less than the density of water, so that they tend to float upward as chambers 472 are filled with water.

By way of example and without limitation, to utilize the buoyance effect, piston arm assembly members 364*a*, 364*b*, 364*c*, 364*d* and other piston arm members, can be constructed of a lightweight magnesium metal alloy matrix composite which is reinforced with silicon carbide hollow particles, or from materials that have a similar composition and similar density to compression strength ratio. By using such materials, the combined piston arm members can have a density which is less than water. The drive piston head 382 can be constructed from state-of-the-art materials that are utilized in high pressure food processing equipment. The combined buoyant force of all the piston arm members along with the force of the decompressing biasing springs 374 can be used to restore the piston arm member assembly to its starting position, after each cycle. In some embodiments an additional force can work in conjunction with the above-mentioned forces by injecting pneumatic air pressure into compression chamber 165 during the re-set cycle. This air pressure can come from external pneumatic source 110 and or from the pneumatic system that is charged by compressor 650.

The air in chamber 372 is evacuated through lines 360 and line 620 by pump 650. Valves 318, 310*a* and 310*b* (FIG. 6) are closed. Water from chamber 146 fills chambers 372. To facilitate water movement between chamber 146 and chambers 372, vapor lock valve 629 is opened, and piston arm member 354 rises to its starting position. Air is then re-introduced into chambers 372, and drain water from chambers 372 is removed, piston arm member 354 is in its re-set starting position, shown in FIG. 3A.

For freshwater embodiments, water from chamber 372 can be moved by pump 626 through valves 361, lines 360, line 624, and valve 622, filling chamber 165, line 166, and chambers 472. After chamber 165, line 166 and chambers 472 are filled with water, if a specific configuration requires more water to be removed from intensifier 140 this may be accomplished by pumping water from chambers 372 through line 645 and into chamber 675 by utilizing pump 647. The system is then re-set and ready to start a new cycle.

For saltwater applications, pump 626, line 624, and valve 622 can be eliminated. Water that was used to drive the intensifier can be pumped from chamber 372 through line 645 and into chamber 675 by utilizing pump 647. The system is then re-set and ready to start a new cycle.

Industrial facilities often consume a significant amount of energy to develop hydraulic, and hydrostatic pressure, for use in their processes. Often after this pressurized fluid has been used it is discarded as waste. This is especially true within the High-Pressure Food Processing Industry (HPP). Embodiments of the present invention are designed to utilize this otherwise wasted pressurized fluid to create energy and/or oxygen and hydrogen.

Figure 7:
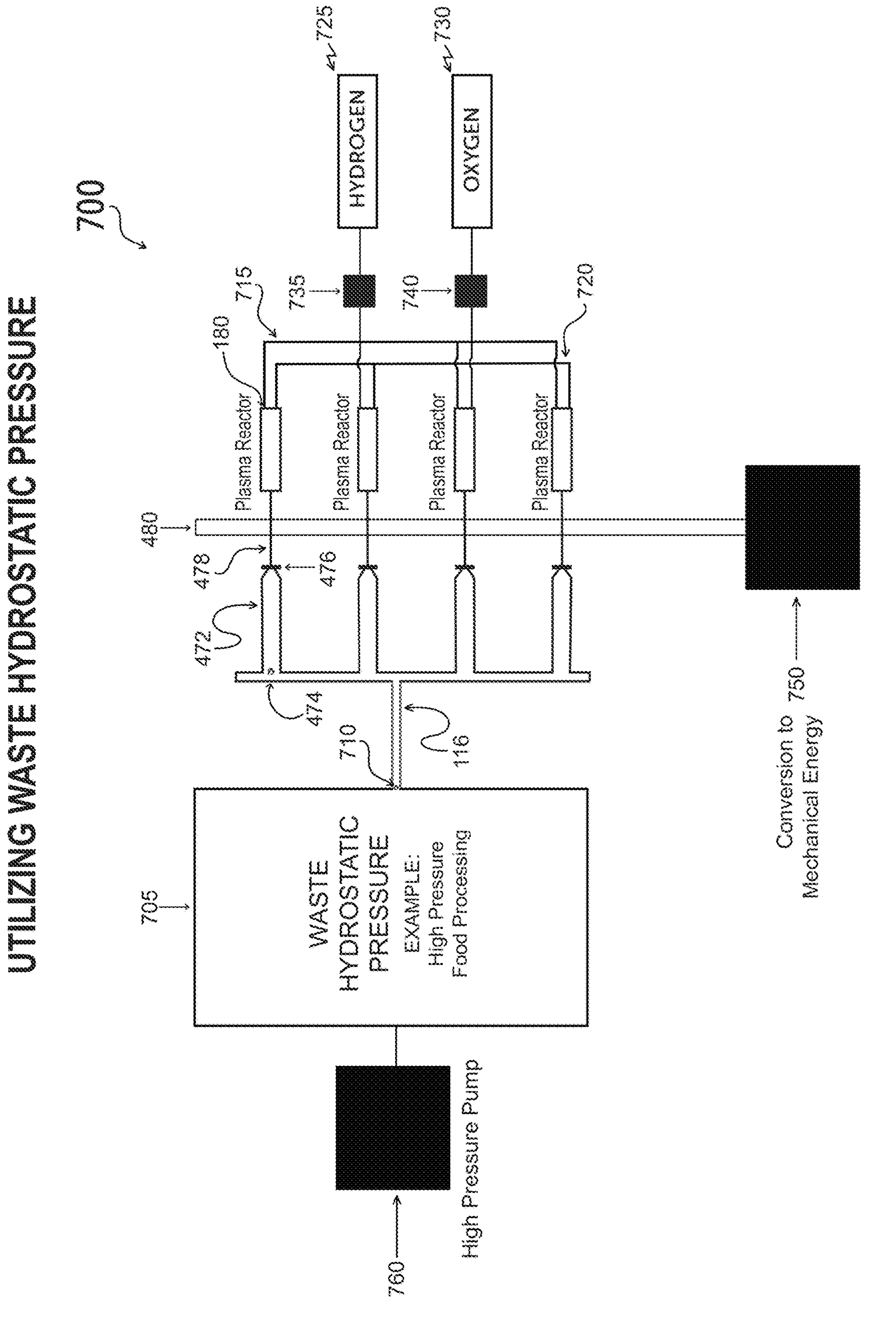
FIG. 7 is a schematic cross-sectional view of an embodiment of the invention utilizing unused or wasted hydrostatic pressure from industrial processes.

Referring to the exemplary embodiment of FIG. 7, in comparison to FIG. 4, it is seen that the fluid storage tank 105, pneumatic pressure source 110 and intensifier 140 may be replaced by a high pressure (waste) output 705 from an industrial process, such as a high-pressure pump 760. In these embodiments, a primary compression chamber 705 is emptied of water, and products to be pressurized are placed in this compression chamber. With valves 710 and 474 opened and with valve 476 closed, the primary compression chamber 705, manifold line 116, and compression chambers 472 are filled completely full of water. This water is then pressurized by high pressure pump 760. Valve 474 and valve 710 are closed, isolating the hydrostatic pressure within chambers 472 from the hydrostatic pressure within primary compression chamber 705. Then, valves 476 are opened while valves 474 remain closed, allowing the pressurized water within chambers 472 to decompress through fine bore friction channels 478, converting the decompressing water into vapor and/or steam that flows through impeller shaft 480, which drives mechanical energy conversion unit 750. The water vapor and/or steam then flows into plasma reactors 180 to be separated into hydrogen and oxygen. Pump 735 can be used to move hydrogen gas from plasma reactors 180 through line 715 and into hydrogen tank 725. Pump 740 can be used to move oxygen gas from plasma reactors 180 through lines 720 and into oxygen tank 730.

Figure 8:
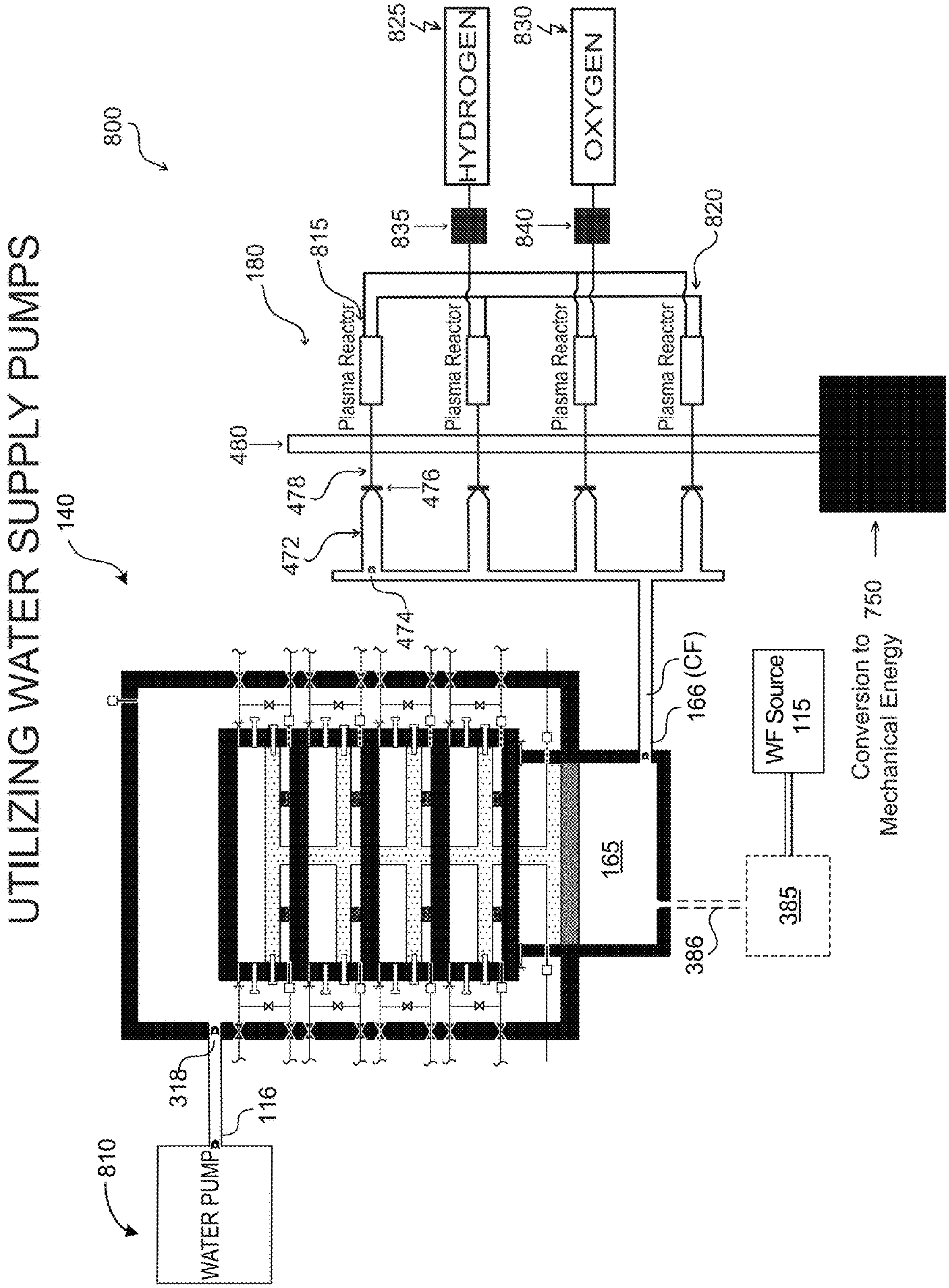
FIG. 8 is a schematic cross-sectional view of an embodiment of the invention utilizing hydrostatic pressure from one or more fluid pumps.

Referring to the exemplary embodiment of FIG. 8, in comparison to FIG. 1, it is seen that instead of a fluid storage tank 105 and pneumatic pressure source 110, intensifier 140 and associated systems can be driven by water pumps and/or water supply systems 810. In these embodiments, a hydraulic water pump 810 charges intensifier 140 through inlet line 116 and valve 318, driving piston arm member 354 to apply pressure through drive piston 382 which then pressurizes fluid in chamber 165, which is fluidly connected through pressure line 166, and valves 474. With valve 476 closed the fluid in chamber 472 is pressurized. Then valve 474 closes isolating the pressurized water in chamber 472 from pressure line 166, and chamber 165. Pressurized water in chamber 472 decompresses through valve 476, and through fine bore friction channels 478 producing water vapor and or steam which is directed through impeller shaft 480 to produce mechanical energy in module 750. Water vapor and or steam is exhausted from impeller shaft 480 into plasma reactor 180 to be separated into hydrogen and oxygen. Pump 835 can be used to move hydrogen gas from plasma reactors 180 through line 815 and into hydrogen tank 825. Pump 840 can be used to move oxygen gas from plasma reactors 180 through line 820 and into oxygen tank 830.

Figure 9:
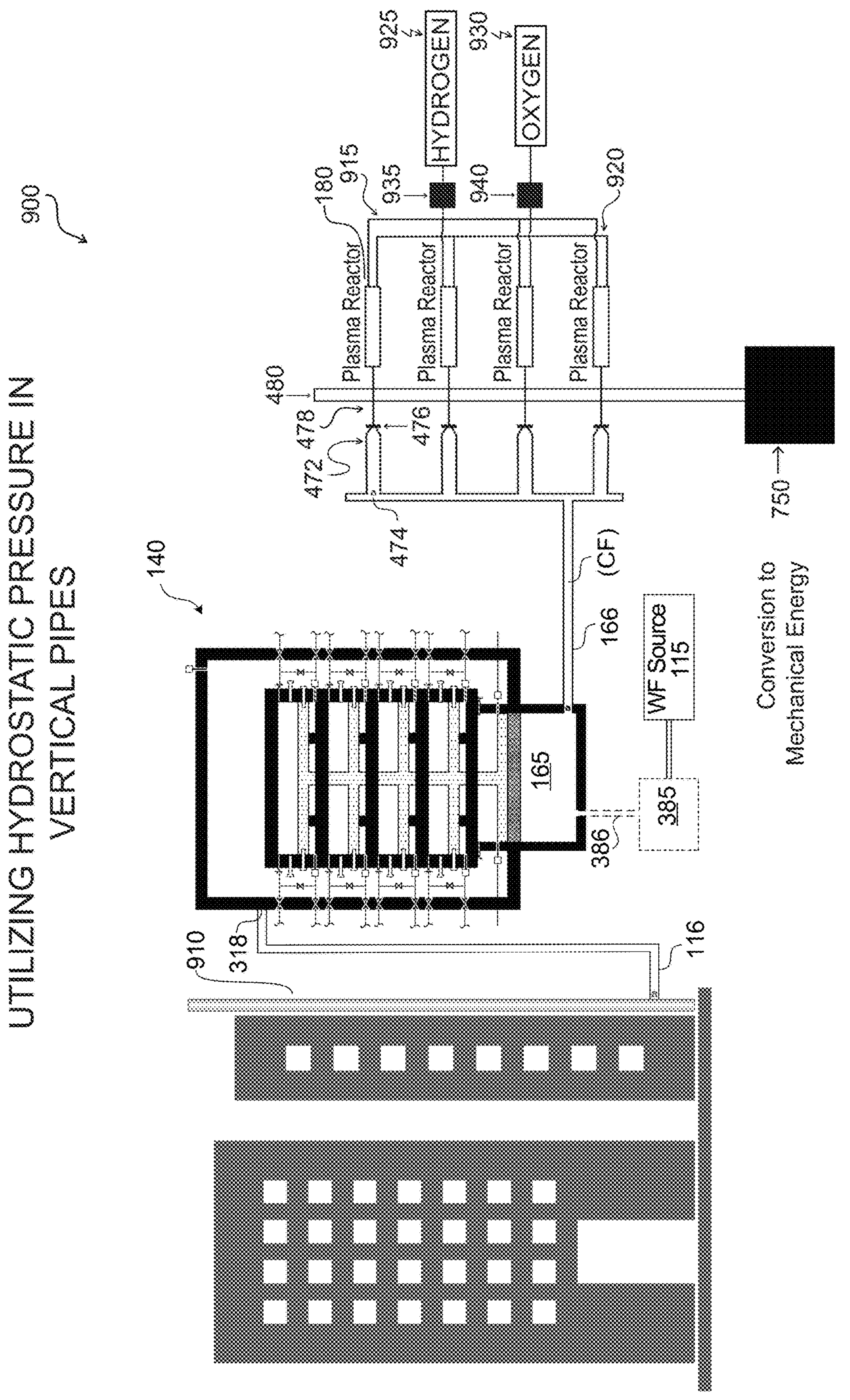
FIG. 9 is a schematic cross-sectional view of an embodiment of the invention utilizing hydrostatic pressure from columns of fluid, in this case the columns are supported by a structure.

Referring to the exemplary embodiment of FIG. 9, in comparison to FIG. 1, it is seen that instead of a fluid storage tank 105 and pneumatic pressure source 110, intensifier 140 and associated systems can be driven by hydrostatic pressure provided from the weight of a column of fluid 910, such as that found in vertical pipes in or supported by buildings. Hydrostatic pressure within element 910 can be applied to intensifier 140 through inlet line 116 and inlet valve 318, driving piston arm member 354 to apply pressure through piston 382 onto fluid in chamber 165, which is fluidly connected through pressure line 166, and valve 474, with pressurized fluid in chamber 472, valve 476 is closed. Then valve 474 closes isolating the pressurized water in chamber 472 from pressure line 166, and chamber 165. Then pressurized water in chamber 472 decompresses through valve 476, and is accelerated through fine bore friction channels 478 producing water vapor and or steam which is directed through impeller shaft 480 to produce mechanical energy and is then exhausted into plasma reactor 180 to be separated into hydrogen and oxygen. Pump 935 can be used to move hydrogen gas from plasma reactors 180 through line 915 and into hydrogen tank 925. Pump 940 can be used to move oxygen gas from plasma reactors 180 through line 920 and into oxygen tank 930.

Figure 10:
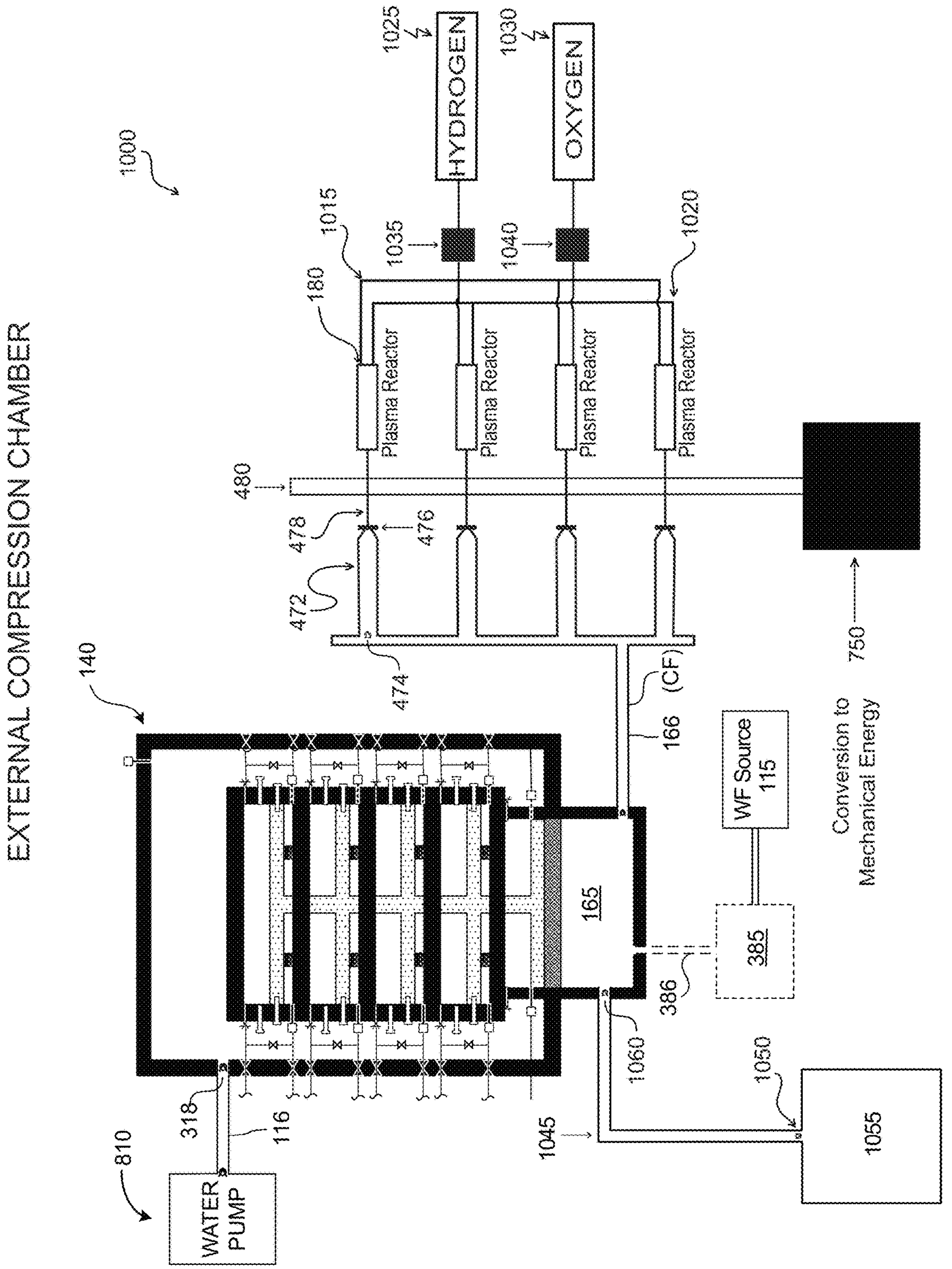
FIG. 10 is a schematic cross-sectional view of an embodiment of the invention fluidly connecting hydrostatic pressure from an embodiment of an intensifier to an embodiment of an external compression chamber.

Referring to the exemplary embodiment of FIG. 10, in comparison to FIG. 1, it is seen that in these embodiments, intensifier 140 develops hydraulic pressure which is applied to chamber 165 through drive piston 382. Hydrostatic pressure within chamber 165 is fluidly connected to external compression chamber 1055 through valves 1060 & 1050, and high-pressure hydraulic line 1045. External compression chamber 1055 can include one or more containers within it that contains products to be pressurized. These products can include pretreating biomass, e.g., for conversion into drop in green hydrocarbon fuels, molding and shaping of materials, high pressure food processing, and potentially many other products of pressurization.

C. Conclusion

It will be apparent to those having skill in the relevant art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, other embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing pressures and other numerical values used in the specification and claims, are to be understood as being modified in all instances by the term "approximately." Accordingly, unless indicated to the contrary, the numerical parameters set forth in the following specification and attached claims are approximations that may vary depending upon the desired properties sought to be obtained by the present technology. When used, the term "approximately" refers to values within +/−10% of the stated value. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10. Additionally, any qualifying terms at the beginning of a list of numbers should be interpreted to affect each of the numbers. For example, the phrase "at least 2, 4, 6, or 8" should be interpreted to mean "at least 2, at least 4, at least 6, or at least 8."

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

D. Other Aspects and Embodiments of the Present Invention

The following is a non-exclusive list of additional aspect, applications, methods and embodiments of the present invention:

First Group:

Embodiments of the invention may include novel approaches to produce feed stock for plasma reactor technology, which leverages the internal energies of water molecules thereby reducing the amount of external energy needed to produce hydrogen and oxygen.

These novel approaches for producing hydrogen and oxygen utilize the frictional heat that is generated when decompressing water can accelerate it through fine bore friction channels, orifices, fittings and/or valves. By this water molecules are converted into vapor and/or steam making them compatible with operational requirements for plasma reactor technology to produce hydrogen and oxygen.

Methods for pressurizing water, which precludes the depressurization process, include utilization of hydrostatic pressure, hydraulic pressure, and/or pneumatic pressure to drive a hydraulic pressure intensifier which can pressurize a fluid filled compression chamber to pressures in excess of 100,000 psi. Decompressing these compression chambers can accelerate water molecules through fine bore friction channels to produce water vapor and/or steam. Some embodiments exclusively utilize one of these three pressure sources as the prime driver for the hydraulic pressure intensifier system (e.g., hydrostatic pressure, hydraulic pressure, and/or pneumatic pressure). Other embodiments utilize various combinations of these three pressures sources as the driver for accelerating water molecules through fine bore friction channels.

This family of embodiments includes a multitude of design embodiments and systems which can be combined to produce the required molecular acceleration. Certain aspects of the present technology disclosed in the context of a specific embodiment can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of this technology.

Second Group:

Other embodiments of invention may utilize the hydrostatic pressure within fluid storage tanks, fluid accumulators and other industrial equipment that contains fluid under hydrostatic pressure, as the prime drivers for the hydraulic pressure intensifier which accelerates water molecules through fine bore friction channels, conditioning the water molecules to become feed stock for plasma reactor technology, and producing hydrogen and oxygen.

These embodiments may utilize buildings and structures to support pipes, tubes, conduits, or other fluid filled containers which develop hydrostatic pressure from their fluid collum height, for applying pressure to embodiments of the intensifier and systems, which accelerates water molecules through fine bore friction channels, conditioning the water molecules to become feed stock for plasma reactor technology, producing hydrogen and oxygen.

These embodiments may utilize the hydrostatic pressure in bodies of water for applying pressure to our intensifier and systems, which accelerates water molecules through fine bore friction channels, conditioning the water molecules to become feed stock for plasma reactor technology, producing hydrogen and oxygen. When utilizing the hydrostatic pressure within bodies of water to generate molecular acceleration, embodiments of this patent family can include our novel methods and systems for raising the produced hydrogen, oxygen and the excess water used to drive the intensifier, to the surface of the body of water.

These embodiments may utilize hydraulic pumps, water pumps, and water supply pumping systems to apply pressure to the fluid intensifier which accelerates water molecules through fine bore friction channels, conditioning the water molecules to become feed stock for plasma reactor technology, producing hydrogen and oxygen.

These embodiments may utilize pneumatic pumps, offshore ocean wave pneumatic pumps, windmills, and other methods for compressing air, to apply pressure to the fluid intensifiers and systems, which accelerates water molecules through fine bore friction channels, conditioning the water molecules to become feed stock for plasma reactor technology, producing hydrogen and oxygen.

These embodiments may recover waste hydrostatic pressure from industrial processes, such as high-pressure food processing, by accelerating water molecules through our fine bore friction channel system during decompression, producing feed stock for plasma reactor technology to produce hydrogen and oxygen.

Third Group:

These embodiments may utilize an impeller shaft that is designed into various family systems between the point where water vapor and or steam exhaust from the fine bore friction channels and before it enters the plasma reactor, to produce mechanical energy.

These embodiments may produce products to be pressurized within the compression chamber of the intensifier and/or have external compression chambers that contains products of pressurization, and which are fluidly connected to the internal compression chamber.

These embodiments may utilize wind generators that are positioned along roads, highways and in tunnels to capture the wind generated by vehicles, including trains, trucks, busses, and automobiles to apply pressure to the fluid intensifiers and systems, which accelerates water molecules through fine bore friction channels, conditioning the water molecules to become feed stock for plasma reactor technology, producing hydrogen and oxygen.

These embodiments may be systems and methods that utilize site specific characteristics to facilitate their functionality. Offshore oil pumping platforms can be utilized to access hydrostatically pressurized water, driving the intensifier which accelerates water molecules through fine bore friction channels, conditioning the water molecules to become feed stock for plasma reactor technology, producing hydrogen and oxygen. The water that is used to drive the intensifier can be drained from the intensifier to be integrated into underwater systems including systems that cool crude oil pumps. The produced hydrogen and oxygen can be brought to the surface with our systems and method for raising hydrogen and oxygen. Alternately, the water that is used to drive the intensifier can be integrated into our systems and method for raising hydrogen and oxygen to the surface.

These embodiments may be utilized at specific depths, within bodies of water, to directly supply hydrostatic pressure to our friction channel bore system, to become feed stock for plasma reactor technology, to produce hydrogen and oxygen. The produced hydrogen and oxygen can be brought to the surface with our systems and method for raising hydrogen and oxygen. Additionally, any water making it through the system that is not converted to hydrogen or oxygen can be moved to the surface by utilizing our system and method for raising hydrogen and oxygen to the surface.

These embodiments may be systems and methods that utilize site specific characteristics to facilitate their functionality. Well shafts can be drilled adjacent to bodies of water, including creeks, rivers, or any other body of water. Our system and or parts of our system can be placed down the shaft which is filled with water.

Hydrostatic pressure from the water in the shaft drives our intensifier which accelerates water molecules through fine bore friction channels, conditioning the water molecules to become feed stock for plasma reactor technology, producing hydrogen and oxygen. The site-specific terrain where this system is placed facilitates low energy consumption for removal of the water driving the intensifier and for recovery of the produced hydrogen and oxygen.

These embodiments may be designed to utilize a double-sided piston in a hydraulic intensifier. Whereas the ratio between the area of the piston that is receiving fluid pressure and the area of the piston that is applying fluid pressure is such that the piston area that is applying fluid pressure is magnitudes of order smaller than the piston area that is receiving fluid pressure. Pressure from the intensifier that is applied to the compression chamber can be magnitudes of order greater than the fluid pressure that is initially applied to the intensifier. By utilizing this piston area ratio difference, water molecules can be accelerated by decompression through fine bore friction channels conditioning the water to become feed stock for plasma reactor technology which produces hydrogen and oxygen.

These embodiments may be designed whereas the secondary fluid compression chambers of the intensifier, (the chambers which feed the plasma reactors), have a two-sided internal piston, pneumatic on one side and hydraulic on the other side. The system can be designed and timed to apply pneumatic pressure against one side of this piston as hydrostatic pressure on the other side of the piston is being decompressed to accelerate water molecules through fine bore friction channels, conditioning the water to become feed stock for plasma reactor technology, producing hydrogen and oxygen.

Fourth Group:

These embodiments may accelerate water downward through vertical or semi-vertical pipes, tubes, and/or conduits transitioning the accelerated water into fine bore friction channels, conditioning the water to become feed stock for plasma reactor technology, to produce hydrogen and oxygen.

These embodiments may accelerate water downward through vertical pipes, tubes, and/or conduits that are positioned within bodies of water, including within water that is behind hydroelectric dams, transitioning the accelerated water into fine bore friction channels, conditioning the water to become feed stock for plasma reactor technology, to produce hydrogen and oxygen. The produced hydrogen and oxygen, along with excess water flow that is not converted into water vapor and/or steam, can be brought to the surface by our system and method for raising hydrogen, oxygen, and excess water to the surface when it is produced within bodies of water.

These embodiments may accelerate ambient moist-air mixtures through venturi inlets that are attached to powered vehicles. The flow of the incoming moist-air mixture through the venturi transitions to fine bore friction channels which conditions the moist air mixture to become feed stock for plasma reactor technology, to produce hydrogen and oxygen.

These embodiments may be systems and methods for expanding the energy output capacity of windmills. The propeller blades of the windmill can have internal channels that allow timed water to accelerate from tip to tip during rotation. The accelerating water induces a shock wave through a double-sided piston and water filled compression line that exhaust into fine bore friction channels, conditioning the water to become feed stock for plasma reactor technology, to produce hydrogen and oxygen.

These embodiments may be systems and methods for expanding the energy output capacity of windmills. The propeller blades of the windmill can have internal channels that accelerate water during rotation. As the accelerating water approaches each tip of the blade it transitions into venturi channels and or into fine bore friction channels, which converts the water into vapor and or steam, to become feed stock for plasma reactor technology, to produce hydrogen and oxygen.

These embodiments may be systems and methods that utilize site specific characteristics to facilitate their functionality. Pipes can be laid on river and creek beds to produce a fluid pressure head that drives our intensifier, accelerating water molecules through fine bore friction channels, conditioning the water molecules to become feed stock for plasma reactor technology, producing hydrogen and oxygen.

These embodiments may be systems and methods that utilize site specific characteristics to facilitate their functionality. Solar tunnel bore's can be drilled and utilized in site specific locations to enable updraft winds to drive pneumatic pumps for pressurizing the hydraulic intensifier, which accelerates water molecules through fine bore friction channels, conditioning the water molecules to become feed stock for plasma reactor technology, producing hydrogen and oxygen.

These embodiments may be systems and methods that condense water out of ambient air. A thermally conductive pipe can be placed on a slight grade. A fan blows moist ambient air through the thermally conductive pipe. Conductive tubes can be wound around the outside diameter of this conductive pipe. Valves inside the tubing divide it into sections. A nipple valve projects from each of these tubing sections. The conductive tubing is filled with water and pressurized by the intensifier, interior valves close dividing the tubing into sections that are now full of pressurized water. The Fluid pressure in each section is decompressed through the nipple valves, accelerating water molecules through fine bore friction channels. The friction channel bore tubes are also wrapped around the conductive pipe that is placed on a slight grade. As the decompressing water is converted to vapor and or steam, heat is drawn from within the conductive pipe that is placed on a slight grade causing the ambient moist air that is blown through it to condense. Fresh water flows down this pipe that is placed on a slight grade. The water molecules that are accelerated through fine bore friction channels are conditioned to become feed stock for plasma reactor technology, producing hydrogen and oxygen.

These embodiments may utilize the heat transfer effect that occurs when our system accelerates water molecules through fine bore friction channels. Operationally, as the accelerated water molecules change state from liquid to gas, heat is drawn from the space where the phase change takes place. Embodiments of this patent family can be designed to air condition enclosures while producing hydrogen and oxygen.

E. Potential Applications for Various Embodiments

The following is a non-exclusive list of potential applications of various embodiments of the present invention:

Utilizing fluid accumulators and or other equipment that contain pressurized fluid to apply pressure to the intensifier and systems, and to produce hydrogen, oxygen, mechanical energy, and products of pressurization.

Utilizing the hydrostatic pressure in bodies of water (Including both fresh and salt bodies of water) to apply pressure to the intensifier in order to produce hydrogen, oxygen, mechanical energy, and products of pressurization.

Systems and methods for raising hydrogen, oxygen, and the water that is used to drive the intensifier to the surface after the hydrogen and oxygen have been produced under water.

Utilizing buildings and structures to support pipes, tubes, conduits, or other fluid filled containers which develops hydrostatic pressure from their fluid collum height, for applying pressure to the intensifier and systems, to produce hydrogen, oxygen, mechanical energy, and products of pressurization.

Recovering waste hydrostatic pressure from industrial processes to produce hydrogen, oxygen, and mechanical energy, when the waste fluid pressure decompressed through systems of the present invention (un some embodiments, without the need of the intensifier), especially the waste hydrostatic and hydraulic pressure used in the high-pressure food processing industry.

Utilizing hydraulic pumps and or pneumatic pumps to supply pressure to the intensifier and systems for producing hydrogen, oxygen, mechanical energy, and products of pressurization.

Utilizing compression chambers that are external to the primary compression chamber of the intensifier which produces products of pressurization, and for producing energy and/or providing other functions.

Utilizing municipal and private water supply and pumping systems to apply pressure to the intensifier and systems, to produce hydrogen, oxygen, mechanical energy, and products of pressurization.

Utilizing municipal and private water supply tanks and towers to apply pressure to the intensifier and systems, to produce hydrogen, oxygen, mechanical energy, and products of pressurization.

Utilizing municipal and private sewage treatment tanks and systems to apply pressure to the intensifier and systems, to produce hydrogen, oxygen, mechanical energy, and products of pressurization.

At specific depths, within bodies of water, supply hydrostatic pressure to embodiments of the fine bore friction channels, orifices, fittings and/or valves without the need of our intensifier, to produce hydrogen, oxygen, mechanical energy, and products of pressurization.

Utilizing offshore ocean wave pneumatic pumps to apply pressure to embodiments of the intensifiers and systems, to produce hydrogen, oxygen, mechanical energy, and products of pressurization.

Utilizing windmills and other methods for compressing air, to apply pressure to the intensifiers and systems, to produce hydrogen, oxygen, mechanical energy, and products of pressurization.

Utilizing wind generators that are positioned along roads, highways and in tunnels to capture the wind generated by vehicles, including trains, trucks, busses, and automobiles to apply pressure to embodiments of the intensifiers and systems, to produce hydrogen, oxygen, mechanical energy, and products of pressurization.

Accelerating water down vertical (or steep grades) through pipes, tubes, and conduits, that have smooth internal walls and which transition to fine bore friction channels to produce water vapor and or steam that in turn produces mechanical energy and is exhausted from the mechanical portion of the system into plasma reactors to produce hydrogen and oxygen.

Accelerating water down vertical pipes, tubes, and conduits that are positioned within bodies of water, including within water that is behind hydroelectric dams. The vertical pipes, tubes, and conduits extend from near the surface of the water down to near the bottom of the water. The vertical pipes, tubes, and conduits have smooth internal walls which transition into fine bore friction channels near the bottom of their downward acceleration. Water flowing through the friction channels produces water vapor and or steam that in turn produces mechanical energy. From the mechanical energy part of the system, water vapor and or steam is exhausted as feed stock into plasma reactors to produce hydrogen, and oxygen. The produced hydrogen and oxygen, along with excess water flow, that is not converted into water vapor and/or steam, can be brought to the surface by embodiments of the systems and methods for raising hydrogen, oxygen and excess water to the surface when it is produced below the surface in bodies of water.

A venturi inlet attached to powered vehicles, including planes, jets, trains, automobiles, motorcycles, and other vehicles, such that ambient moisture enters the venturi when the vehicle is in motion. The flow of the incoming air-moisture mixture through the venturi transitions to and is connected to fine bore capillary friction channels which produce water vapor and or steam to be converted into mechanical energy and who's exhaust is fed into plasma reactors, to produce hydrogen, oxygen, and mechanical energy. After the plasma reactors have separated out the hydrogen and oxygen, within these powered vehicles, it can be immediately fed into internal combustion engines, or other engines that utilize hydrogen as a fuel source. This can be one solution to help eliminate the problem of transporting volatile hydrogen.

Systems and methods for expanding the energy output capacity of windmills. The propeller blades of the windmill have internal channels that allow timed water to drop from tip to tip during rotation. The accelerating water from one tip hits a double-sided piston at the other tip. This sends a shock wave through the piston and into a line that is filled with water. A valve is timed with the shock wave to open allowing water to flow into and through fine bore friction channels where it is converted into water vapor and or steam, the water vapor and or steam exits the friction channel to produce mechanical energy and exhausting from the mechanical energy production portion of the system into plasma reactors to produce hydrogen and oxygen.

Systems and methods for expanding the energy output capacity of windmills. Water is accelerated within the propeller blade as it rotates from tip to tip through pipes, tubes, and/or conduits that are within the blade. As the accelerating water approaches each tip of the blade, the pipes, tubes, and/or conduits transition into fine bore friction channels, which converts the water into vapor and or steam, the water vapor and or steam exits the friction channel to produce mechanical energy and is exhausted from the mechanical energy production portion of the system into plasma reactors to produce hydrogen and oxygen.

Embodiments of the present invention may be located in site specific places, such as below the water's surface at offshore oil pumping platforms. The hydrostatically pressurized water that is used to drive the intensifier can be drained from the intensifier and be integrated into systems that cool oil pumps. The produced hydrogen and oxygen can be brought to the surface with embodiments of the systems and methods for raising hydrogen and oxygen to the surface when it is produced below the surface in bodies of water.

Embodiments of the present invention, specifically the intensifier, may be located in site specific places, such as below the water's surface at offshore oil pumping platforms. The marine hydrostatic pressure that was used to drive the intensifier can be pumped or drained from the intensifier and be integrated into the oil pump cooling systems. The pressure developed within chamber 165 FIG. 4 which is fluidly connected to chambers 472 through lines 166 can be designed such that chambers 472 and plasma reactors 180 are located above the surface of the water on an oil pumping platform. The decompressing water can produce mechanical energy, hydrogen, oxygen, and products of pressurization above sea level, without the need for moving the produced hydrogen and oxygen to the surface.

Embodiments of the present invention may be located in site specific places, such as laying pipes on river and creek beds. Water can flow down these pipes to produce a pressure head that can be used to drive embodiments of the intensifier and systems which can be used to produce hydrogen, oxygen, mechanical energy, and products of pressurization.

Embodiments of the present invention may be located in site specific places that have favorable terrain. Such as drilling a well shaft adjacent to bodies of water, including creeks and rivers, and then placing our intensifier unit down the shaft. The shaft fills with water and the site-specific terrain makes it easy to drain the water that was used to drive the intensifier.

Embodiments of the present invention may utilize solar tunnel bores that drive pneumatic pumps to pressurize an intensifier. In site specific places, drilling a vertical or near vertical bore hole shaft. The bottom end of the drilled shaft opens into a green house. Warm air from the greenhouse travels up the bore hole shaft to drive a windmill. Blades of the windmill are designed to receive the up flow of air most efficiently through the drilled shaft. Intensifier and system can be utilized to produce hydrogen, oxygen, mechanical energy, and products of pressurization.

Embodiments of the present invention may be combined with existing or new windmill towers converting them into hybrid solar updraft windmill towers. Up-draft wind in the tower can drive impellers which drive an air compressor, that applies pneumatic pressure to our hydraulic intensifier and systems, to produce mechanical energy, hydrogen, oxygen, and products of pressurization. Additionally, the updraft wind in, the windmill tower can drive impellers which drive a generator for electrical production.

Embodiments of the present invention may utilize systems and methods for condensing water out of ambient air. A thermally conductive pipe is placed on a slight grade. Conductive tubes and or pipes are wound around the outside diameter of this conductive pipe, for the length of the pipe. (Such as copper tubing, or other thermally conductive tubing material) The conductive tubing is filled with water and pressurized by the intensifier. Valves within the conductive tubing are placed so that the lineal distance of the tubing that is coiled around the pipe is divided into sections. These valves are closed off after the water in the coiled tubing has been brought up to pressure. With these valves closed, each section of the coiled tubing is isolated from every other section and the water within each section of the tubing is at a high pressure. Each of these pressurized tubing sections has a nipple tube attached to it with a valve that opens into a friction channel bore tube. The friction channel bore tubing is also wrapped around the conductive pipe that is placed on a slight grade. As the pressurized water in the coiled tubing decompresses through the friction channels bore coiled tubing, the heat energy that is used to change the state of water from liquid to vapor or steam comes from the heat that is within the conductive pipe which is placed on a slight grade. Ambient air, with its moisture is pumped through this thermally conductive pipe that is placed on a slight grade. The ambient moist air that is being pumped through this pipe condenses, allowing the condensate to flow down the pipe, coming out at its lower end as fresh water. The water vapor or steam that is exiting the friction channel bore is used to produce mechanical energy, and then fed into the plasma reactor to produce hydrogen, and oxygen.

Embodiments of the present invention may utilize the heat transfer effect that occurs when pressurized water decompresses through fine bore friction channels, changing its phase from liquid to vapor and steam. Embodiments of the intensifier can be in the same space or in a separate space from the heat exchanger system that is constructed from fine bore friction channels, but fluidly connected to it. When this fine bore friction channel heat exchanger is operational, it will draw heat from the space where it is placed. While the system is producing mechanical energy, hydrogen, and oxygen, it can simultaneously be utilized to lower the surrounding temperature of the space where it is placed.

Additional aspects of the present technology are described below, and various examples of the present technology are described as numbered clauses (1, 2, 3, etc.) for convenience. These clauses are provided as examples and do not limit the present technology. It is noted that any of the dependent clauses may be combined in any combination, and placed into a respective independent clause.

1. An industrial system for utilizing hydraulic pressure from a storage tank to generate energy, the system comprising: a storage tank containing fluid; a separator piston including a cylinder and a separator piston member movable within the cylinder, the separator piston member defining a first separator compartment configured to be fluidically coupled to a bottom portion of the storage tank, and a second separator compartment fluidically isolated from the first separator compartment, wherein the separator piston is configured to transfer pressure of the first separator compartment to the second separator compartment; and a pressure intensifier including—a first compartment configured to receive a gaseous fluid and configured to be fluidically coupled to a pressure source; a second compartment fluidically isolated from the first compartment and configured to be fluidically coupled to the second separator compartment of the separator piston, wherein the second compartment is configured to be filled with a working fluid; a base interface between and abutting the first compartment and the second compartment, the base interface being moveable within the pressure intensifier in response to a pressure change of the first compartment and/or the second compartment; a compression chamber fluidically isolated from the second compartment and configured to contain a compressed fluid; and a pressure concentrator within the second compartment of the pressure intensifier, the pressure concentrator including—a housing; a piston head member including arms; a plurality of base cylinders each defined at least in part by the housing of the pressure concentrator, wherein each of the base cylinders and the piston head member at least in part define a first compartment configured to contain the working fluid, and a second compartment spaced apart from the first compartment by the arms of the piston head member; a biasing member exerting a force against the corresponding arm of the piston head member in a direction toward the first compartment of the base cylinders; and a drive piston head portion, wherein, in operation—arms of the piston head member acting within the base cylinders are each configured to receive pressure from the working fluid, and the drive piston head portion is configured to exert, on the compressed fluid, a pressure approximately equal to the collective exerted pressures of the arms of the piston head member.

2. The system of any one of the clauses herein, further comprising a manifold coupled to the compression chamber, the manifold including a plurality of chambers and a plurality of friction channels downstream of the chambers, wherein each of the friction channels is fluidically coupled to a corresponding one of the chambers, and wherein, in operation, flow of the compressed fluid through the friction channels generates water vapor and/or steam.
3. The system of clause 2, further comprising one of more modules downstream of and fluidically coupled to the friction channels, wherein the one or more modules are configured to disassociate the generated water vapor and/or steam into at least one of hydrogen or oxygen.
4. The system of any one of the clauses herein, wherein the separator piston member is a single component and comprises the drive piston head portion.
5. The system of any one of the clauses herein, further comprising a heater positioned to heat fluid provided to the compression chamber.
6. The system of any one of the clauses herein, wherein the pressure the drive piston head portion is configured to exert on the compressed fluid is at least 50,000 psi or between 1,000-100,000 psi.
7. The system of any one of the clauses herein, wherein the pressure source is a pneumatic pressure source configured to provide a gaseous fluid to the first compartment of the pressure intensifier.
8. The system of any one of the clauses herein, further comprising a container having one or more products, wherein the container is in the compression chamber and is processed by the pressure of the compression chamber.
9. The system of any one of the clauses herein, further comprising an interface in the compression chamber and abutting the drive piston head portion, the interface comprising a piezoelectric material, wherein, in operation, the piezoelectric material generates a charge in response to the pressure applied via the drive piston member.
10. An industrial system for utilizing hydraulic pressure to generate energy, the system comprising: a pressure intensifier positioned to receive a working fluid having a pressure corresponding to a pressure of a fluid external to the pressure intensifier, the pressure intensifier including—a first compartment configured to receive a pressurized gaseous fluid; a second compartment fluidically isolated from the first compartment and configured to be filled with the working fluid; a base interface between and abutting the first compartment and the second compartment, the base interface being moveable within the pressure intensifier in response to a pressure change of the first compartment and/or the second compartment; and a compression chamber fluidically isolated from the second compartment and configured to contain a compressed fluid; and a pressure concentrator within the second compartment of the pressure intensifier, the pressure concentrator including—a housing; a piston head member including arms; a plurality of base cylinders each defined at least in part by the housing of the pressure concentrator, wherein each of the base cylinders and the piston head member at least in part define a first compartment configured to contain the working fluid, and a second compartment spaced apart from the first compartment of the corresponding piston by the arms of the piston head member, a biasing member exerting a force against the portion of the piston head member in a direction toward the first compartment of the corresponding piston; and a drive piston head portion, wherein, in operation, (i) the arms of the piston head member acting within the base cylinders are each configured to receive a pressure from the working fluid, and (ii) the drive piston head portion is configured to exert a pressure approximately equal to the collective exerted pressures of the arms of the piston head member; and a manifold downstream of and fluidically coupled to the compression chamber, the manifold including a plurality of chambers and a plurality of friction channels downstream of the chambers, wherein each of the friction channels is fluidically coupled to a corresponding one of the chambers, and wherein, in operation, flow of the compressed fluid through the channels generates water vapor and/or steam.
11. The system of any one of the clauses herein, further comprising one of more modules downstream of and fluidically coupled to the manifold, wherein the one or more modules are configured to disassociate the compressed fluid into hydrogen and oxygen.
12. The system of any one of the clauses herein, further comprising a container having one or more products, wherein the container is in the compression chamber and is processed by the pressure of the compression chamber.
13. The system of clause 12, further comprising an interface in the compression chamber and abutting the drive piston head portion, the interface comprising a piezoelectric material, wherein, in operation, the piezoelectric material generates a charge in response to the pressure applied via the drive piston member.
14. The system of any one of the clauses herein, further comprising: a storage tank containing the fluid external to the pressure intensifier; and a separator piston, the separator piston including a cylinder and a separator piston member movable within the cylinder, the separator piston member defining a first separator compartment configured to be fluidically coupled to a bottom portion of the storage tank, and a second separator compartment fluidically isolated from the first separator compartment, wherein the separator piston is configured to transfer pressure of the first separator compartment to the second separator compartment.

15. The system of any one of the clauses herein, further comprising a separator piston, the separator piston including a cylinder and a separator piston member movable within the cylinder, the separator piston member defining a first separator compartment fluidically coupled to a bottom portion of the storage tank, and a second separator compartment fluidically isolated from the first separator compartment, wherein the separator piston is configured to transfer pressure of the first separator compartment to the second separator compartment.

16. A method for utilizing hydrostatic and/or hydraulic pressure to generate energy, the method comprising: providing a system including a separator piston and a pressure intensifier positioned to receive a working fluid, the separator piston including a cylinder and a separator piston member movable within the cylinder, the separator piston member defining a first separator compartment, and a second separator compartment fluidically isolated from the first separator compartment, wherein the separator piston is configured to transfer pressure of the first separator compartment to the second separator compartment, the pressure intensifier including—a first compartment; a second compartment fluidically isolated from the first compartment; a base interface between and abutting the first compartment and the second compartment; a pressure concentrator within the second compartment of the pressure intensifier, the pressure concentrator including a housing, a piston head member including arms, a plurality of base cylinders each defined at least in part by the housing, and a plurality of biasing members in a corresponding one of the base cylinders, wherein—each of the base cylinders and the arms of the piston head member at least in part define a first compartment and a second compartment spaced apart from the first compartment, the arms of the piston head member acting within the base cylinders receive a force from the working fluid in the first compartment of each of the base cylinders, and each of the biasing members exert a force against the corresponding arms of piston head member in a direction toward the corresponding first compartment; and a compression chamber fluidically isolated from the second compartment, wherein the drive piston head portion abuts the compression chamber; filling the second compartment of the pressure intensifier and the first compartments of the pistons with a working fluid; applying, via the separator piston, a hydraulic force to the working fluid within the pressure intensifier; applying, via the first compartment of the pressure intensifier, additional pressure to the second compartment of the pressure intensifier, thereby causing the drive piston head portion to compress the fluid within the compression chamber and generate a compressed fluid, wherein the pressure exerted via the drive piston head portion is approximately equal to the sum of the pressures exerted via the pistons; and utilizing the compressed fluid to generate energy.

17. The method of any one of the clauses herein, wherein the system further comprises a manifold including a plurality of chambers and a plurality of channels downstream of the chambers, wherein each of the friction channels is fluidically coupled to a corresponding one of the chambers, and wherein utilizing the compressed fluid comprises directing the compressed fluid through the friction channels to generate water vapor and/or steam.

18. The method of clause 17, wherein the system further comprises a plurality of modules downstream of the channels, the method further comprising directing the generated steam and/or water vapor through the plurality of modules to disassociate the steam into at least one of hydrogen or oxygen.

19. The method of any one of the clauses herein, wherein applying the additional pressure via the first compartment causes the piston head member to move toward the compression chamber and the pistons to compress the corresponding biasing members, and wherein utilizing the compressed fluid comprises depressurizing the compression chamber, the method further comprising: depressurizing the second compartment of the pressure intensifier by fluidically isolating the pressure intensifier from the separator piston and equalizing the pressures of the first compartments and the second compartments of each of the cylinders; and recharging the pressure intensifier and applying the hydraulic pressure to the working fluid within the pressure intensifier via the separator piston.

20. The method of any one of the clauses herein, wherein, prior to applying the additional pressure, the portions of the piston head members for the pistons are locked in place via shear pins, the method further comprising, after applying the hydraulic and before applying the additional pressure, disengaging the shear pins such that the portions of the piston head members are free to move in response to the additional pressure.

21. The system of any one of the clauses herein, further comprising a manifold coupled to the compression chamber, the manifold including a plurality of chambers and a plurality of friction channels downstream of the chambers, wherein each of the friction channels is fluidically coupled to a corresponding one of the chambers, and wherein, in operation, flow of the decompressing fluid through the friction channels generates water vapor and/or steam.

22. The system of clause 21, further comprising one of more plasma reactor modules downstream of and fluidically coupled to the friction channels, wherein the one or more plasma reactor modules are configured to disassociate the generated water vapor and/or steam into at least one of hydrogen or oxygen. Potential catalysts include without limitation, gases such as nitrogen, argon, helium, xenon, krypton, etc. If catalysts are injected into the plasma reactor with the water vapor and or steam, other molecular constituents can be produced, in addition to the hydrogen and oxygen.

23. The system of any one of the clauses herein, further comprising a container having one or more products, wherein the container is in a compression chamber and is processed by the pressure of the compression chamber.

24. An industrial system for utilizing hydraulic pressure to generate energy, the system comprising: a pressure intensifier positioned to receive a working fluid having a pressure corresponding to a pressure of a fluid external to the pressure intensifier, the pressure intensifier including—a first compartment configured to receive a pressurized gaseous fluid; a second compartment fluidically isolated from the first compartment and configured to be filled with the working fluid; a base interface between and abutting the first compartment and the second compartment, the base interface being moveable within the pressure intensifier in response to a pressure change of the first compartment and/or the second compartment; and a compression chamber fluidically isolated from the second compartment and configured to contain a compressed fluid; and a pressure concentrator within the second compartment of the pressure intensifier, the pressure concentrator including—a housing; a piston head member including arms; a plurality of base cylinders each defined at least in part by the housing of the pressure concentrator, wherein each of the base cylinders and the piston head member at least in part define a first compartment configured to contain the working fluid, and a second compartment spaced apart from the first compartment of the corresponding piston by the arms of the piston head member, a biasing member exerting a force against the portion of the piston head member in a direction toward the first compartment of the corresponding piston; and a drive piston head portion, wherein, in operation, (i) the arms of the piston head member acting within the base cylinders are each configured to receive a pressure from the working fluid, and (ii) the drive piston head portion is configured to exert a pressure approximately equal to the collective exerted pressures of the arms of the piston head member; and a manifold downstream of and fluidically coupled to the compression chamber, the manifold including a plurality of chambers and a plurality of friction channels downstream of the chambers, wherein each of the friction channels is fluidically coupled to a corresponding one of the chambers, and wherein, in operation, flow of the decompressing fluid through the channels generates water vapor and/or steam.

25. The system of any one of the clauses herein, further comprising a container having one or more products, wherein the container is in the compression chamber and is processed by the pressure of the compression chamber. Additionally, a container having one or more products can be located externally to the compression chamber with hydraulic lines connecting it to the intensifier compression chamber.

26. An industrial system for utilizing hydrostatic pressure from a storage tank to generate energy, the system comprising: a pressure concentrator including—a housing; a piston head member including arms; a plurality of base cylinders each defined at least in part by the housing of the pressure concentrator, wherein each of the base cylinders and the corresponding arm of the piston head member at least in part define a first compartment configured to contain the working fluid, and a second compartment spaced apart from the first compartment by the corresponding arm of the piston head member; a biasing member exerting a force against the corresponding arm of the piston head member in a direction toward the corresponding first compartment of the base cylinders; and a drive piston head portion, wherein, in operation—the arms of the piston head member acting within the base cylinders are each configured to receive a pressure from the working fluid, and the drive piston head portion is configured to exert, on the compressed fluid, a pressure approximately equal to the collective exerted pressures of the arms of the piston head member.

27. The system of any one of the clauses herein, further comprising a pressure intensifier including a first compartment configured to receive a gaseous fluid and configured to be fluidically coupled to a pressure source; a second compartment fluidically isolated from the first compartment, wherein the second compartment is configured to be filled with a working fluid; and a base interface between and abutting the first compartment and the second compartment, the base interface being moveable within the pressure intensifier in response to a pressure change of the first compartment and/or the second compartment; wherein the pressure concentrator is within the second compartment of the pressure intensifier.

28. The system of any one of the clauses herein, wherein the pressure intensifier further comprises a compression chamber fluidically isolated from the second compartment of the pressure intensifier and configured to contain a compressed fluid to receive the exerted pressure from the first drive piston head portion of the pressure concentrator.

29. The system of any one of the clauses herein, further comprising a manifold coupled to the compression chamber, the manifold including a plurality of chambers and a plurality of friction channels downstream of the chambers, wherein each of the friction channels is fluidically coupled to the chamber, and wherein, in operation, flow of the compressed fluid through the channel generates steam and/or water vapor.

30. The system of any one of the clauses herein, further comprising a module downstream of and fluidically coupled to the friction channel, wherein the module is configured to disassociate the generated steam and/or water vapor into at least one of hydrogen or oxygen.

31. The system of any one of the clauses herein, further comprising a container having one or more products, wherein the container is in the compression chamber and is processed by the pressure of the compression chamber.

32. The system of any one of the clauses herein, further comprising an interface in the compression chamber and abutting the drive piston head portion, the interface comprising a piezoelectric material, wherein, in operation, the piezoelectric material generates a charge in response to the pressure applied via the drive piston head portion.

33. The system of any one of the clauses herein, further comprising a separator piston including a cylinder and a separator piston member movable within the cylinder.

34. The system of any one of the clauses herein, wherein the separator piston member defines, at least in part, a first separator compartment, and a second separator compartment fluidically isolated from the first separator compartment, wherein the separator piston is configured to transfer pressure of the first separator compartment to the second separator compartment.

35. The system of any one of the clauses herein, further comprising a storage tank containing fluid, wherein a bottom portion of the storage tank is fluidically coupled to the first separator compartment.

36. The system of any one of the clauses herein, wherein the pressure source is a pneumatic pressure source configured to provide the gaseous fluid to the first compartment of the pressure intensifier.

37. The system of any one of the clauses herein, wherein the piston head member is a single component and comprises the drive piston head portion.
38. The system of any one of the clauses herein, wherein the drive piston head portion is configured to exert a pressure between 3,000-100,000 psi.
39. An industrial system for utilizing hydraulic pressure to generate energy, the system comprising: a pressure concentrator including—a housing; a piston head member within the housing and including arms; a plurality of base cylinders each defined at least in part by the housing of the pressure concentrator, wherein each of the base cylinders is operably coupled to a corresponding arm of the piston head member, and wherein each of the base cylinders and the corresponding arm of the piston head member at least in part define a first compartment configured to contain a working fluid, and a second compartment spaced apart from the first compartment by the corresponding arm of the piston head member, a biasing member exerting a force against the corresponding arm of the piston head member in a direction toward the first compartment of the corresponding arm; and a drive piston head portion, wherein, in operation, (i) the arms of the piston head member acting within the base cylinders are each subjected to a pressure from the working fluid, and (ii) the drive piston head portion is configured to exert a pressure approximately equal to the collective exerted pressures of the arms of the piston head member; and a compression chamber fluidically isolated from the pressure concentrator, wherein the compression chamber is configured to contain a compressed fluid that is subjected to the exerted pressure of the drive piston head portion.
40. The system of any one of the clauses herein, further comprising a manifold downstream of and fluidically coupled to the compression chamber, the manifold including a plurality of chambers and a plurality of friction channels downstream of the chambers, wherein individual ones of the friction channels are fluidically coupled to a corresponding one of the chambers, and wherein, in operation, flow of the compressed fluid through the channels generates steam and/or water vapor.
41. The system of any one of the clauses herein, further comprising one or more reactor modules downstream of and fluidically coupled to the manifold, wherein the one or more reactor modules are configured to disassociate the compressed fluid into hydrogen and oxygen.
42. The system of any one of the clauses herein, further comprising a container having one or more products, wherein the container is in the compression chamber and is processed by the pressure of the compression chamber.
43. The system of any one of the clauses herein, further comprising an interface in the compression chamber and abutting the drive piston head portion, the interface comprising a piezoelectric material, wherein, in operation, the piezoelectric material generates a charge in response to the pressure applied via the drive piston head portion.
44. The system of any one of the clauses herein, further comprising a pressure intensifier positioned to receive the working fluid, the pressure intensifier including—a first compartment positioned to receive a pressurized gaseous fluid; a second compartment fluidically isolated from the first compartment and configured to be filled with the working fluid; a base interface between and abutting the first compartment and the second compartment, the base interface being moveable within the pressure intensifier in response to a pressure change of the first compartment and/or the second compartment, wherein the pressure concentrator is within the second compartment.
45. The system of any one of the clauses herein, further comprising: a storage tank fluidically coupled to the pressure intensifier; and a separator piston, the separator piston including a cylinder and a separator piston member movable within the cylinder, the separator piston member defining a first separator compartment configured to be fluidically coupled to a bottom portion of the storage tank, and a second separator compartment fluidically isolated from the first separator compartment, wherein the separator piston is configured to transfer pressure of the first separator compartment to the second separator compartment.
46. The system of any one of the clauses herein, wherein the piston head member is a single component and comprises the drive piston head portion.
47. The system of any one of the clauses herein, wherein the drive piston head portion is configured to exert a pressure between 3,000-100,000 psi.
48. An industrial system for utilizing hydraulic or pressure to separate water into hydrogen and oxygen, the system comprising: a source of pressurized fluid; a pressure concentrator including—a housing; a piston head member within the housing and including arms and a drive piston portion; at least one chamber, each such chamber defined at least in part by the housing of the pressure concentrator, wherein each of the chambers is operably coupled to a corresponding arm of the piston head member, and wherein each of the chambers and the corresponding arm of the piston head member at least in part define a first compartment configured to receive fluid from the source of pressurized fluid, and a second compartment spaced apart from the first compartment by the corresponding arm of the piston head member; and at least one biasing member in each second compartment exerting a force against the corresponding arm of the piston head member in a direction toward the first compartment of the corresponding arm; a compression chamber fluidically isolated from the pressure concentrator, wherein the compression chamber is configured to contain a compressed fluid that is subjected pressure of the drive piston head portion; at least one decompression chamber in fluid communication with the compression chamber; a friction channel downstream from each decompression chamber; and a plasma reactor fluidically coupled to each friction channel, each plasma reactor configured to disassociate steam and/or water vapor into at least one of hydrogen or oxygen.
49. The system of any one of the clauses herein, further comprising a manifold coupled between the compression chamber and a plurality of decompression chambers, with a plurality of friction channels downstream of the chambers, and with a plurality of plasma reactors coupled to the friction channels.
50. The system of any one of the clauses herein, wherein the source of pressurized fluid is unused hydrostatic pressure from an industrial process.
51. The system of any one of the clauses herein, wherein the source of pressurized fluid is hydrostatic pressure from at least one fluid pump.

52. The system of any one of the clauses herein, wherein the source of pressurized fluid is at least one vertical column of fluid supported by a structure.
53. The system of any one of the clauses herein, further comprising an external compression chamber in fluid communication with said compression chamber.
54. The system of any one of the clauses herein, wherein the system is submerged in a body of water, the source of pressurized fluid is water from the body of water outside of said housing, and a source of air is provided in communication with the second compartments of said pressure concentrator.
55. The system of any one of the clauses herein, wherein said source of air comprises a first line 640 leading from above a surface of said body of water, said third line being in communication with the second compartments of said pressure concentrator.
56. The system of any one of the clauses herein, further comprising a second line leading from each plasma reactor to a storage tank located above the surface of said body of water for transporting hydrogen separated in each such plasma reactor to said first storage tank.
57. The system of any one of the clauses herein, further comprising a third line leading from each plasma reactor to a second storage tank 690 located near the surface of said body of water for transporting oxygen separated in each such plasma reactor to said second storage tank.
58. The system of any one of the clauses herein, further comprising an oxygen-water separator located on said third line near said second storage tank.
59. The system of any one of the clauses herein, further comprising a pump located between said oxygen-water separator and said second storage tank.
60. The system of any one of the clauses herein, further comprising an external cylinder located on said third line between said plasma reactors and said oxygen-water separator, said cylinder having a moveable piston located therein defining an upper area and a lower area, wherein said third line is in communication with said upper area, a source of water is in communication with said upper area, and a source of air is in communication with said lower area.
61. The system of any one of the clauses herein, further comprising an impeller housing provided between the at least one decompression chamber and its associated plasma reactor, the housing surrounding a rotatable shaft having an impeller between each decompression chamber and its associated plasma reactor.
62. The system of any one of the clauses herein, wherein said rotatable shaft is connected to a drive air compressor that is in communication with the lower area of said moveable piston.
63. The system of any one of the clauses herein, wherein said system is deployed in salt water and further comprising a desalination unit between said outside water and said pressure concentrator.
64. The system of any one of the clauses herein, wherein said desalination unit is in communication with said compression chamber and said second compartments.
65. The system of any one of the clauses herein, further comprising a fourth line extending between said pressure chamber 165 and said first compartments of said pressure concentrator.
66. The system of any one of the clauses herein, wherein said piston head member is made from a material that is buoyant in water.
67. The system of any one of the clauses herein, further comprising a pressure intensifier positioned to receive a working fluid, the pressure intensifier including—a third compartment in fluid communication with the source of pressurized fluid; a fourth compartment fluidically isolated from the third compartment and configured to be filled with the working fluid; a base interface between and abutting the third compartment and the fourth compartment, the base interface being moveable within the pressure intensifier in response to a pressure change of the third compartment and/or the fourth compartment, wherein the pressure concentrator is within the fourth compartment.
68. The system of any one of the clauses herein, wherein the pressure intensifier further comprises a compression chamber fluidically isolated from the fourth compartment of the pressure intensifier and configured to contain a compressed fluid to receive pressure exerted from the first drive piston head portion of the pressure concentrator.
69. The system of any one of the clauses herein, wherein the source of pressurized fluid is a storage tank that is fluidically coupled to the pressure intensifier, the system further comprising: a separator piston, the separator piston including a cylinder and a separator piston member movable within the cylinder, the separator piston member defining a first separator compartment configured to be fluidically coupled to a bottom portion of the storage tank, and a second separator compartment fluidically isolated from the first separator compartment, wherein the separator piston is configured to transfer pressure of the first separator compartment to the second separator compartment.
70. The system of any one of the clauses herein, further comprising a manifold downstream of and fluidically coupled to the compression chamber, the manifold including a plurality of chambers and a plurality of friction channels downstream of the chambers, wherein individual ones of the friction channels are fluidically coupled to a corresponding one of the chambers, and wherein, in operation, flow of the compressed fluid through the channels generates steam and/or water vapor.
71. The system of any one of the clauses herein, further comprising one or more plasma reactors downstream of and fluidically coupled to the manifold, wherein the one or more reactor modules are configured to disassociate the compressed fluid into hydrogen and oxygen.
72. An apparatus for utilizing pressurized fluid to generate energy comprising: (a) a source of fluid under pressure; (b) a pressure concentrator comprising at least one internal chamber; (c) a separate pressure chamber fluidly isolated from said pressure concentrator; (d) a moveable piston member located inside said pressure concentrator, said piston member including at least one compression arm in each internal chamber and a drive piston portion that extends into said separate pressure chamber; (e) at least one decompression chamber in fluid communication with the separate compression chamber; (f) at least one friction channel 478 in fluid communication with and downstream from each decompression chamber; and (g) at least one plasma reactor 180 fluidically coupled to and downstream from each friction channel.
73. The system or apparatus of any one of the clauses herein, wherein each internal chamber comprises a first compartment on one side of said piston compression arm, and a second compartment on the opposite side of said compression arm, wherein said first compartment is in fluid communication with said source of fluid under pressure, and said second compartment is in communication with an external air outlet.

74. The system or apparatus of any one of the clauses herein, further comprising at least one biasing member in each second compartment exerting a force against the corresponding arm of the piston member in a direction toward the first compartment of the corresponding arm.

75. The system or apparatus of any one of the clauses herein, wherein said pressure concentrator, said separate pressure chamber, said at least one decompression chamber, said at least one friction channel and said at least one plasma reactor are all submerged in a body of water, and the source of pressurized fluid is water from the body of water outside of said pressure concentrator, and a source of air 640 is provided in communication with the second compartments of said pressure concentrator.

76. The system or apparatus of any one of the clauses herein, wherein said piston member is made from a material that is buoyant in water.

77. The system or apparatus of any one of the clauses herein, wherein said body of water is salt water, and further comprising a desalination unit between said outside water and said pressure concentrator.

78. A method of utilizing pressurized fluid to generate energy comprising the steps of: (a) providing fluid under pressure into a first compartment of a chamber located within a pressure concentrator, said first compartment being separated from a second compartment of said chamber by an arm of a movable piston member, said piston member having a drive portion extending into a separate pressure chamber that is fluidly isolated from said pressure concentrator; (b) said fluid under pressure moving said arm toward said second compartment, and moving said drive portion into said pressure chamber to compress water contained therein; (c) allowing said compressed water to travel from said separate pressure chamber to at least one decompression chamber to convert said water into water vapor; (d) transferring said water vapor from said decompression chamber to at least one friction channel downstream from each decompression chamber; and (e) transferring said water vapor from said at least one friction channel to at least one plasma reactor, each such plasma reactor configured to disassociate said water vapor into at least one of hydrogen or oxygen.

79. The system or apparatus or method of any one of the clauses herein, comprising the additional steps of: (f) transferring the hydrogen from each such plasma reactor to a hydrogen storage unit; and (g) transferring the oxygen from each such plasma reactor to an oxygen storage unit.

80. The system or apparatus or method of any one of the clauses herein, comprising the additional steps of: (f) transferring the hydrogen from each such plasma reactor to a hydrogen storage unit; (g) transferring the oxygen from each such plasma reactor to a fluid pressure chamber; (h) transferring water from said pressure concentrator to said fluid pressure chamber; (i) transferring oxygen and water from said fluid pressure chamber to an oxygen-water separator; and (j) transferring oxygen from said oxygen-water separator to an oxygen storage unit.

What is claimed is:

1. An industrial system for utilizing hydraulic and/or hydrostatic pressure to separate water into hydrogen and oxygen, the system comprising:

a source of pressurized fluid;

a pressure concentrator including— a housing;

a piston head member within the housing and including arms and a drive piston portion;

at least one chamber, each such chamber defined at least in part by the housing of the pressure concentrator, wherein each of the chambers is operably coupled to a corresponding arm of the piston head member, and wherein each of the chambers and the corresponding arm of the piston head member at least in part define a first compartment configured to receive fluid from the source of pressurized fluid, and a second compartment spaced apart from the first compartment by the corresponding arm of the piston head member; and at least one biasing member in each second compartment exerting a force against the corresponding arm of the piston head member in a direction toward the first compartment of the corresponding arm;

a compression chamber fluidically isolated from the pressure concentrator, wherein the compression chamber is configured to contain a compressed fluid that is subjected to pressure from the drive piston portion;

at least one decompression chamber in fluid communication with the compression chamber;

a manifold coupled between the compression chamber and the at least one decompression chamber, a friction channel downstream from each decompression chamber; and a plasma reactor fluidically coupled to each friction channel, each plasma reactor configured to disassociate steam and/or water vapor into at least one of hydrogen or oxygen.

2. The system of claim 1, further comprising an external compression chamber in fluid communication with said compression chamber.

3. The system of claim 1, further comprising a pressure intensifier positioned to receive a working fluid, the pressure intensifier including— a third compartment in fluid communication with the source of pressurized fluid;

a fourth compartment fluidically isolated from the third compartment and configured to be filled with the working fluid;

a base interface between and abutting the third compartment and the fourth compartment, the base interface being moveable within the pressure intensifier in response to a pressure change of the third compartment and/or the fourth compartment, wherein the pressure concentrator is within the fourth compartment.

4. The system of claim 3 wherein the compression chamber is fluidically isolated from the fourth compartment of the pressure intensifier and configured to contain the compressed fluid to receive pressure exerted from the drive piston portion of the pressure concentrator.

5. The system of claim 3 wherein the source of pressurized fluid is a storage tank that is fluidically coupled to the pressure intensifier, the system further comprising:

a separator piston, the separator piston including a cylinder and a separator piston member movable within the cylinder, the separator piston member defining a first separator compartment configured to be fluidically coupled to a bottom portion of the storage tank, and a second separator compartment fluidically isolated from the first separator compartment, wherein the separator piston is configured to transfer pressure of the first separator compartment to the second separator compartment.

6. The system of claim 1, wherein, in operation, flow of the compressed fluid through each friction channel generates steam and/or water vapor.

7. An apparatus for utilizing pressurized fluid to generate energy comprising:

a) a source of fluid under pressure;

b) a pressure concentrator comprising at least one internal chamber;

c) a separate pressure chamber fluidly isolated from said pressure concentrator;

d) a moveable piston member located inside said pressure concentrator, said piston member including at least one compression arm in each internal chamber and a drive piston portion that extends into said separate pressure chamber wherein said piston member is made from a material that is buoyant in water;

e) at least one decompression chamber in fluid communication with the separate pressure chamber;

f) at least one friction channel in fluid communication with and downstream from each decompression chamber; and g) at least one plasma reactor fluidically coupled to and downstream from each friction channel.

8. The apparatus of claim 7 wherein said pressure concentrator, said separate pressure chamber, said at least one decompression chamber, said at least one friction channel and said at least one plasma reactor are all submerged in a body of water, and the source of pressurized fluid is water from the body of water outside of said pressure concentrator, and a source of air is provided in communication with the at least one internal chamber of said pressure concentrator.

9. The apparatus of claim 8 wherein said body of water is salt water, and further comprising a desalination unit between said outside water and said pressure concentrator.

10. A method of utilizing pressurized fluid to generate energy comprising the steps of:

a) providing fluid under pressure into a first compartment of a chamber located within a pressure concentrator, said first compartment being separated from a second compartment of said chamber by an arm of a movable piston member, said piston member having a drive portion extending into a separate pressure chamber that is fluidly isolated from said pressure concentrator;

b) said fluid under pressure moving said arm toward said second compartment, and moving said drive portion into said pressure chamber to compress water contained therein;

c) allowing said compressed water to travel from said separate pressure chamber to at least one decompression chamber to convert said water into water vapor;

d) transferring said water vapor from said decompression chamber to at least one friction channel downstream from each decompression chamber;

e) transferring said water vapor from said at least one friction channel to at least one plasma reactor, each such plasma reactor configured to disassociate said water vapor into hydrogen and oxygen; and f) transferring the hydrogen from each such plasma reactor to a hydrogen storage unit.

11. The method of claim 10 comprising the additional steps of:

f) transferring the oxygen from each such plasma reactor to an oxygen storage unit.

12. The method of claim 10 comprising the additional steps of:

f) transferring the oxygen from each such plasma reactor to a fluid pressure chamber;

g) transferring water from said pressure concentrator to said fluid pressure chamber;

h) transferring oxygen and water from said fluid pressure chamber to an oxygen-water separator; and i) transferring oxygen from said oxygen-water separator to an oxygen storage unit.

13. The method of claim 10 wherein the step of transferring said water vapor from said at least one friction channel to at least one plasma reactor comprises the additional step of rotating an impeller located on a rotatable shaft for providing mechanical energy.

14. The method of claim 13 wherein the mechanical energy is used to operate a pneumatic compressor pump.

* * * * *